US012802705B2

(12) United States Patent
Rosenwein et al.

(10) Patent No.: US 12,802,705 B2
(45) Date of Patent: Nov. 17, 2026

(54) PRESERVING SOUNDS-OF-INTEREST IN AUDIO SIGNALS

(71) Applicant: ORCAM TECHNOLOGIES LTD., Jerusalem (IL)

(72) Inventors: Tal Rosenwein, Herzliya (IL); Roi Nathan, Jerusalem (IL); Ronen Katsir, Efrat (IL); Oded Lacher, Giv'at Ye'arim (IL); Yonatan Shiftan, Jerusalem (IL); Oren Tadmor, Mevaseret Tsiyon (IL); Amnon Shashua, Mevaseret Tsiyon (IL)

(73) Assignee: ORCAM TECHNOLOGIES LTD., Jerusalem (IL)

( * ) Notice: Subject to any disclaimer, the term of this patent is extended or adjusted under 35 U.S.C. 154(b) by 187 days.

(21) Appl. No.: 18/397,929

(22) Filed: Dec. 27, 2023

(65) Prior Publication Data

US 2024/0127850 A1 Apr. 18, 2024

Related U.S. Application Data

(63) Continuation of application No. PCT/IL2023/050609, filed on Jun. 13, 2023.

(Continued)

(51) Int. Cl.

*G10L 21/028* (2013.01)
*G06F 3/16* (2006.01)

(Continued)

(52) U.S. Cl.

CPC ............ *G10L 21/028* (2013.01); *G06F 3/165* (2013.01); *G06F 16/68* (2019.01); *G10L 17/02* (2013.01); *G10L 17/04* (2013.01); *G10L 17/06* (2013.01); *G10L 17/20* (2013.01); *G10L 17/22* (2013.01); *G10L 21/0208* (2013.01); *G10L 21/0232* (2013.01); *G10L 21/0272* (2013.01); *G10L 25/30* (2013.01); *G10L 25/54* (2013.01); *G10L 25/84* (2013.01); *G10L 2021/02087* (2013.01); *G10L 2021/02163* (2013.01); *G10L 2021/02165* (2013.01); *G10L 2021/02166* (2013.01)

(58) Field of Classification Search

CPC .... G10L 21/028; G10L 21/0364; G10L 17/06
See application file for complete search history.

(56) References Cited

U.S. PATENT DOCUMENTS 9,961,435 B1 * 5/2018 Goyal .................. H04R 1/1083
11,501,772 B2 * 11/2022 Meacham ............... G10L 25/51

(Continued)

*Primary Examiner* — Shaun Roberts
(74) *Attorney, Agent, or Firm* — Myers Wolin, LLC

(57) ABSTRACT

A method, system and product includes capturing a noisy audio signal from an environment of a user in which a plurality of people participate in a conversation, the plurality of people comprising a person, the noisy audio signal includes audio emitted by a non-human object and audio emitted by the person; applying speech separation on the noisy audio signal to obtain a separate audio signal that represents a sound-of-interest, the separate audio signal is based on the audio emitted by the non-human object; generating an enhanced audio signal based on the separate audio signal, wherein said generating comprises ensuring that the separate audio signal is present in the enhanced audio signal; and outputting the enhanced audio signal to the user via at least one hearable device.

20 Claims, 9 Drawing Sheets

Related U.S. Application Data

(60) Provisional application No. 63/351,454, filed on Jun. 13, 2022.

(51) Int. Cl.

| | |
|---|---|
| ***G06F 16/68*** | (2019.01) |
| ***G10L 17/02*** | (2013.01) |
| ***G10L 17/04*** | (2013.01) |
| ***G10L 17/06*** | (2013.01) |
| ***G10L 17/20*** | (2013.01) |
| ***G10L 17/22*** | (2013.01) |
| ***G10L 21/0208*** | (2013.01) |
| ***G10L 21/0232*** | (2013.01) |
| ***G10L 21/0272*** | (2013.01) |
| ***G10L 25/30*** | (2013.01) |
| ***G10L 25/54*** | (2013.01) |
| ***G10L 25/84*** | (2013.01) |
| *G10L 21/0216* | (2013.01) |

(56) References Cited

U.S. PATENT DOCUMENTS

| | | | | | |
|---|---|---|---|---|---|
| 11,871,198 | B1 * | 1/2024 | Robinson | G06F 3/013 | |
| 2005/0265563 | A1 * | 12/2005 | Maisano | H04R 25/407 | 381/91 |
| 2007/0021958 | A1 * | 1/2007 | Visser | G10L 25/78 | 704/226 |
| 2013/0223660 | A1 * | 8/2013 | Olafsson | H04R 25/407 | 381/313 |
| 2014/0140517 | A1 * | 5/2014 | Kim | G10L 25/51 | 381/56 |
| 2014/0198934 | A1 * | 7/2014 | Recker | H04R 25/505 | 381/313 |
| 2014/0334644 | A1 * | 11/2014 | Selig | H04R 25/04 | 381/108 |
| 2015/0172831 | A1 * | 6/2015 | Dittberner | H04R 25/70 | 381/314 |
| 2016/0155452 | A1 * | 6/2016 | Sharifi | G10L 19/06 | 381/56 |
| 2016/0162254 | A1 * | 6/2016 | Benattar | G10K 11/17837 | 700/94 |
| 2017/0061978 | A1 * | 3/2017 | Wang | G10L 21/0232 | |
| 2018/0077483 | A1 * | 3/2018 | Sahay | G10L 15/1822 | |
| 2019/0005128 | A1 * | 1/2019 | Barari | H04N 21/8153 | |
| 2019/0261097 | A1 * | 8/2019 | Glavin | H04R 25/505 | |
| 2019/0392852 | A1 * | 12/2019 | Hijazi | G06N 3/084 | |
| 2020/0296521 | A1 * | 9/2020 | Wexler | G03B 31/00 | |
| 2021/0235202 | A1 * | 7/2021 | Wexler | G06V 40/16 | |
| 2022/0084509 | A1 * | 3/2022 | Sivaraman | G06N 3/045 | |
| 2023/0224442 | A1 * | 7/2023 | Demoulin | G06T 5/70 | 345/419 |
| 2023/0290232 | A1 * | 9/2023 | Candelore | H04R 25/305 | |
| 2025/0046330 | A1 * | 2/2025 | Lindrup | G10L 21/034 | |

* cited by examiner

PRESERVING SOUNDS-OF-INTEREST IN AUDIO SIGNALS

CROSS-REFERENCE TO RELATED APPLICATION

This application is a National Stage Application, filed under 35 U.S.C. § 371, of International Patent Application No. PCT/IL2023/050609, filed on Jun. 13, 2023, entitles "Processing And Utilizing Audio Signals", which claims the benefit of U.S. Provisional Patent Application No. 63/351,454, entitled "A Hearing Aid System", filed Jun. 13, 2022, both of which are hereby incorporated by reference in their entirety without giving rise to disavowment.

TECHNICAL FIELD

The present disclosure relates to processing audio signals in general, and to processing and utilizing audio signals from a noisy environment of a user for a hearable device, in particular.

BACKGROUND

A hearing aid is a device designed to improve hearing by making sound audible to a person with hearing loss or hearing degradation. Hearing aids are used for a variety of pathologies including sensorineural hearing loss, conductive hearing loss, and single-sided deafness. Hearing aids are classified as medical devices in most countries, and regulated by the respective regulations. Hearing aid candidacy is traditionally determined by a Doctor of Audiology, or a certified hearing specialist, who will also fit the device based on the nature and degree of the hearing loss being treated.

Hearables, on the other hand, are over-the-counter ear-worn devices that can be obtained without a prescription, and without meeting specialists. Hearables may typically comprise speakers to convert analog signals to sound, a Bluetooth™ Integrated Circuit (IC) to communicate with other devices, sensors such as biometric sensors, microphones, or the like.

BRIEF SUMMARY

One exemplary embodiment of the disclosed subject matter is a method comprising: capturing a noisy audio signal from an environment of a user, the environment comprising a plurality of people participating in at least one conversation, the plurality of people comprising a person, the noisy audio signal includes audio emitted by a non-human object and audio emitted by the person; applying speech separation on the noisy audio signal to obtain a separate audio signal that represents a sound-of-interest, the separate audio signal is based on the audio emitted by the non-human object; generating an enhanced audio signal, the enhanced audio signal is based at least on the separate audio signal, wherein said generating comprises ensuring that the separate audio signal is present in the enhanced audio signal; and outputting the enhanced audio signal to the user via at least one hearable device.

Optionally, the speech separation comprises extracting the separate audio signal from the noisy audio signal based on an acoustic fingerprint of the non-human object.

Optionally, the speech separation comprises extracting the separate audio signal from the noisy audio signal using a sound retrieval model, the sound retrieval model is trained to retrieve audio based on textual descriptions, wherein the sound retrieval model is provided with a textual description of the audio emitted by the non-human object, causing the sound retrieval model to retrieve the separate audio signal from the noisy audio signal without relying on acoustic fingerprints of the non-human object.

Optionally, said capturing is performed by a single microphone or by multiple microphones.

Optionally, the sound-of-interest is a ringtone, an alert, a car honk, an alarm, a public announcement, a siren, or the like.

Optionally, the non-human object comprises a phone; a public announcement system; a vehicle; an alarm system, or the like.

Optionally, the method further comprises obtaining from the user a list of different types of sounds-of-interests, and the user is enabled to selectively turn on and off filtrations of the different types of the sounds-of-interests.

Optionally, selectively turning on and off the filtrations may be performed via a user interface of a mobile device of the user, or based on an automatic computation.

Optionally, the speech separation is applied on the noisy audio signal to obtain a second separate audio signal that represents the person.

Optionally, said outputting is performed in a first duration of the at least one conversation, the method further comprising: during the first duration, obtaining a user indication indicating that the sound-of-interest is no longer of interest to the user; subsequently to said obtaining the user indication, capturing a second noisy audio signal from the environment of the user at a second duration of the at least one conversation; outputting a second enhanced audio signal to the user via the at least one hearable device at the second duration, the second duration is after the first duration, the second enhanced audio signal is generated to comprise an audio signal that represents the person, the second enhanced audio signal excludes an audio signal that represents the sound-of-interest, whereby the user is enabled to hear the sound-of-interest in the first duration and to not hear the sound-of-interest in the second duration.

Optionally, the noisy audio signal comprises a background sound, wherein the enhanced audio signal excludes the background sound or includes a reduced version of the background sound.

Optionally, the background sound is at least one of: a voice of a second person that is different from the person, and a sound of a non-human object that is not an indicated sound-of-interest.

Another exemplary embodiment of the disclosed subject matter is a computer program product comprising a non-transitory computer readable storage medium retaining program instructions, which program instructions when read by a processor, cause the processor to: capture a noisy audio signal from an environment of a user, the environment comprising a plurality of people participating in at least one conversation, the plurality of people comprising a person, the noisy audio signal includes audio emitted by a non-human object and audio emitted by the person; apply speech separation on the noisy audio signal to obtain a separate audio signal that represents a sound-of-interest, the separate audio signal is based on the audio emitted by the non-human object; generate an enhanced audio signal, the enhanced audio signal is based at least on the separate audio signal, wherein said generating comprises ensuring that the separate audio signal is present in the enhanced audio signal; and output the enhanced audio signal to the user via at least one hearable device.

Yet another exemplary embodiment of the disclosed subject matter is a system comprising a processor and coupled memory, the processor being adapted to: capture a noisy audio signal from an environment of a user, the environment comprising a plurality of people participating in at least one conversation, the plurality of people comprising a person, the noisy audio signal includes audio emitted by a non-human object and audio emitted by the person; apply speech separation on the noisy audio signal to obtain a separate audio signal that represents a sound-of-interest, the separate audio signal is based on the audio emitted by the non-human object; generate an enhanced audio signal, the enhanced audio signal is based at least on the separate audio signal, wherein said generating comprises ensuring that the separate audio signal is present in the enhanced audio signal; and output the enhanced audio signal to the user via at least one hearable device.

Yet another exemplary embodiment of the disclosed subject matter is an apparatus comprising a processor and coupled memory, the processor being adapted to: capture a noisy audio signal from an environment of a user, the environment comprising a plurality of people participating in at least one conversation, the plurality of people comprising a person, the noisy audio signal includes audio emitted by a non-human object and audio emitted by the person; apply speech separation on the noisy audio signal to obtain a separate audio signal that represents a sound-of-interest, the separate audio signal is based on the audio emitted by the non-human object; generate an enhanced audio signal, the enhanced audio signal is based at least on the separate audio signal, wherein said generating comprises ensuring that the separate audio signal is present in the enhanced audio signal; and output the enhanced audio signal to the user via at least one hearable device.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
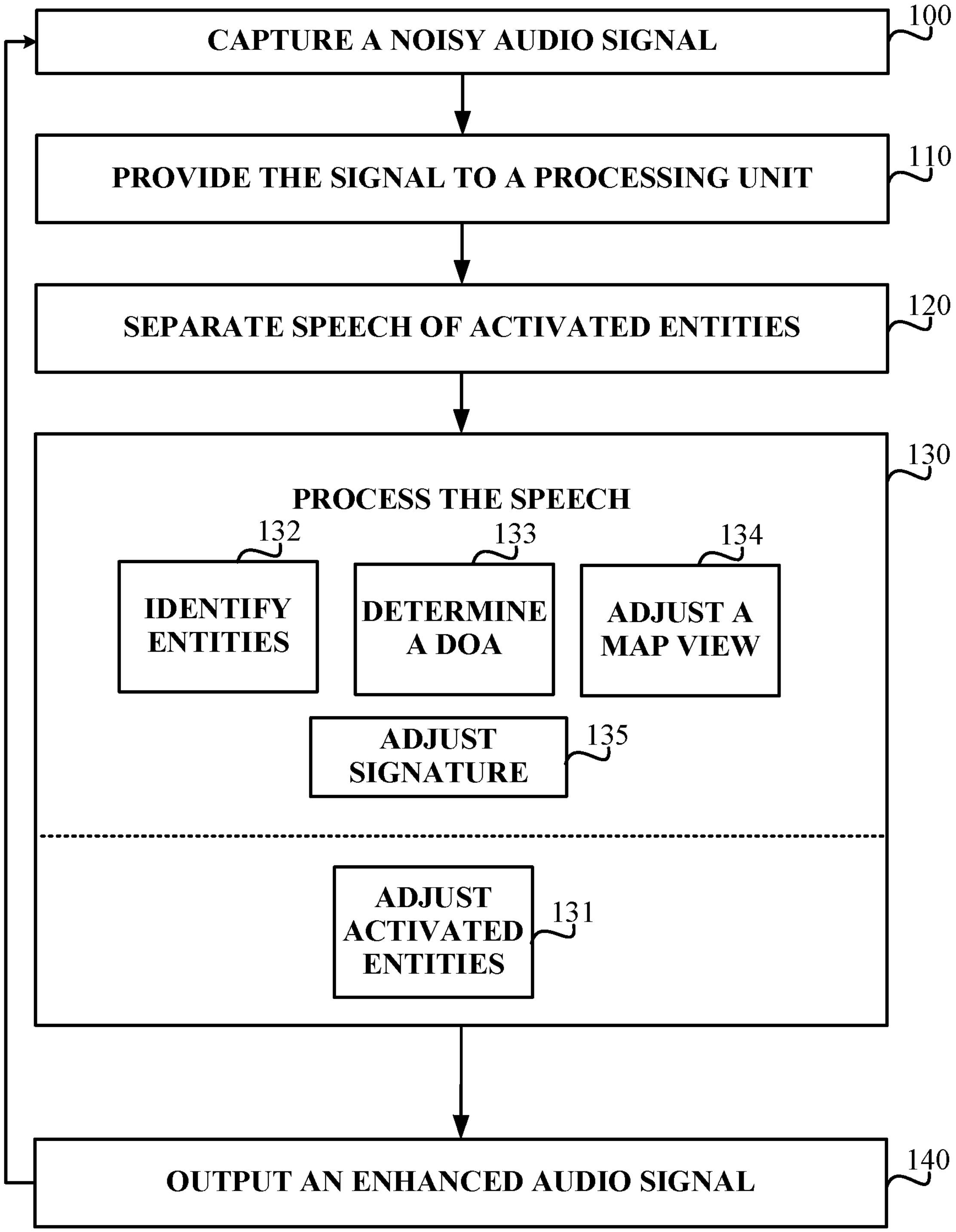
FIG. 1 shows an exemplary flowchart diagram of a method, in accordance with some exemplary embodiments of the disclosed subject matter.

One technical problem dealt with by the disclosed subject matter is enhancing an intelligibility, clarity, audibility, or the like, of one or more entities that a user wishes to hear, e.g., while reducing a listening effort of the user. For example, the user may be located in a noisy environment, may be conversing with multiple people, or the like, and may desire to hear clearly people of choice. In some exemplary embodiments, hearing devices such as hearing aids, hearables, or the like, may have limited functionalities. For example, users of both classical hearing aids and hearables may have limited control over which voices are amplified by the hearing devices, which may negatively affect an attempt of the user to participate in a conversation. As another example, a user may desire to refrain from hearing unwanted sounds, such as speech of a person they do not like. As another example, a user may desire to hear a reduced volume of a sound, such as excessively loud speech. It may be desired to overcome such drawbacks, and provide users with a capability to selectively control the entities they hear, and a degree thereof.

Another technical problem dealt with by the disclosed subject matter is enhancing a user experience of using hearables. For example, it may be desired to provide a user with a user friendly or even seamless interface for controlling functionalities of the hearables, in order to enhance a human-machine interaction.

Yet another technical problem dealt with by the disclosed subject matter is enhancing a functionality of hearables, e.g., to enable an identification of entities that are producing sounds such as voices in the environment of the user. For example, without identifying a speaking entity, it may be difficult for the user to control a voice amplification of the entity.

Yet another technical problem dealt with by the disclosed subject matter is enabling hearables to retain background sounds of choice. Hearables may currently perform noise cancellation (e.g., active noise cancelation, passive filtering with sealed earplugs, or the like) to cancel out a background noise. In some cases, the background noises may comprise important noises such as a siren, and thus removing the background sound entirely may endanger the user. It may be desired to overcome such drawbacks.

Yet another technical problem dealt with by the disclosed subject matter is enhancing a user experience for individuals that do not necessarily have hearing impairments, such as by enabling them to concentrate with lower effort on their conversation in a noisy environment. A human brain is able to focus auditory attention on a particular stimulus while filtering out a range of other stimuli, such as when focusing on a single conversation in a noisy room (the 'cocktail party effect'). However, this brain effort can result with cognitive load and fatigue, as the attempt to filter out irrelevant sounds and focus on the desired stimulus can increase cognitive load and fatigue, and may adversely impact the overall well-being of the user. In some cases, some people may have a difficulty in utilizing the Cocktail party effect, and may struggle to discern and understand specific conversations in noisy environments, e.g., leading to increased stress and anxiety, sensory overload, reduced well-being, or the like. It may be desired to overcome such drawbacks, e.g., to enable people to filter out background sounds easily.

One technical solution provided by the disclosed subject matter is to separate and identify sounds in an environment of the user, so that the user will be enabled to regulate the selection of sounds that are provided to the user, and their volume. For example, the user may be enabled to mute or activate sounds of entities in the environment via a user interface of a mobile device of the user. As another example, sounds of entities in the environment may be activated or muted automatically and dynamically, such as according to predefined settings. In some exemplary embodiments, voices of activated or opted-in entities may be retained, amplified, or the like, and provided to the hearables of the user, e.g., to be reproduced by speakers in the hearables. In some exemplary embodiments, voices of muted entities and remaining background noise may not be separated from a captured audio signal, and may not be provided to the hearables of the user, thereby enhancing an audibility of desired sounds while reducing an audibility of undesired sounds.

In some exemplary embodiments, profiles of various entities may be generated to comprise acoustic fingerprints of the respective entities, contact information thereof, past communications of the entities, or the like. For example, a profile of an entity may comprise a record of the entity, that may or may not comprise an identifier, an acoustic fingerprint, or the like. In some exemplary embodiments, acoustic fingerprints of entities may enable to identify the voices of the entities in a noisy audio signal swiftly, without requiring further analysis of the noisy signal. In some exemplary embodiments, profiles of entities may be generated to comprise respective acoustic fingerprints. In some exemplary embodiments, acoustic fingerprints may be generated automatically, such as based on vocal communications with user contacts, vocal messages, instant messaging applications such as Whatsapp™, social network platforms, past telephone conversations of the user, synthesized speech, or the like. As an example, an audio record sent by a contact of the user may be analyzed to extract an acoustic fingerprint therefrom, and the acoustic fingerprint may be stored in a profile of the contact. In some cases, a designated enrollment audio record, including an audio session of a target entity, may be utilized to generate an acoustic fingerprint of an entity. For example, an entity may comprise a human entity, a non-human entity, or the like. In some exemplary embodiments, an enrollment audio record may comprise an audio of the entity's sound that is a 'clean', e.g., has a minor background noise, has no background noise, is in a quiet environment, is known to belong to the entity, or the like. In other cases, an enrollment audio record may comprise an audio of the entity's sound or synthesized speech, which may be obtained in a noisy environment.

In some exemplary embodiments, acoustic fingerprints may be generated from vocal records stored in an end device, from vocal records stored in a remote server, a combination thereof, or the like. In some exemplary embodiments, a database of acoustic fingerprints may be stored locally in the mobile device of the user, in a different user device, remotely in a cloud, in a server, a combination thereof, or the like. In some exemplary embodiments, acoustic fingerprints may be configured to uniquely identify a voice of an entity such as a person. In some exemplary embodiments, acoustic fingerprints may be utilized to identify sounds of associated entities in audio signals that are captured in the environment of the user, thereby enabling to isolate such sounds. In some exemplary embodiments, one or more models may be trained to receive as input a signature of an entity, such as an acoustic fingerprint, and extract from a noisy audio signal a separate audio signal that corresponds to the acoustic fingerprint. In other cases, any other models may be used for extracting separate audio signals of entities. For example, the models may comprise generative models, discriminative models, masked-based models, beamforming based models, a combination thereof, or the like. In some cases, the models may be configured to operate in the time domain, in the spectral (frequency) domain, a combination thereof, or the like.

In some exemplary embodiments, one or more entities may be activated prior to a conversation, during a conversation with the desired entities, or at any other time. For example, the activation may be performed by the user or automatically, e.g., when identifying a noisy environment. In some exemplary embodiments, a noisy environment may comprise a plurality of people participating in at least one conversation. In some cases, one or more entities (e.g., predefined by the user, including for example people the user wishes to hear) may be activated as a default setting, and the user may adjust the activated entities as desired. For example, a non-human entity that produces siren sounds may be activated as default, to ensure that the user will hear emergency sounds.

In some exemplary embodiments, the user may utilize a mobile device for providing user input, obtaining information, controlling provided audio, or the like. In some exemplary embodiments, the user may utilize hearables for obtaining and hearing the audio output. In some exemplary embodiments, a user may activate an entity by selecting a user interface object that corresponds to the entity, by selecting a profile of the entity, by indicating the entity in any other way, or the like. In some exemplary embodiments, in case a user activates a profile of an entity that lacks an acoustic fingerprint, a new acoustic fingerprint may be dynamically generated for the profile, such as based on captured real time sounds from the respective entity. In case an entity has no profile, an acoustic signature may be obtained explicitly by the user, or implicitly, such as based on real time captured audio. For example, in case the entity is speaking within an environment of the user, audio in the environment may be recorded, and parts of the audio that are spoken by the same entity may be clustered and used to generate an acoustic signature of the entity.

In some exemplary embodiments, one or more noisy audio signals in the user's environment may be captured continuedly, periodically, or the like, and records of captured audio signals may be processed, such as in order to identify speech of activated entities in the audio. For example, acoustic fingerprints of activated entities may be matched in a captured audio signal, and used to generate separate audio signals for each entity. It is noted that an acoustic fingerprint may also identify sounds emitted by non-human entity, such as a sound emitted by a vehicle. In some exemplary embodiments, a verification module may be utilized for double-checking that the extracted sounds are indeed spoken by the respective entities, and for eliminating any identification or separation errors that may occur. In some exemplary embodiments, the extracted sounds may be processed, combined, or the like, to obtain an enhanced audio signal, and the enhanced audio signal may be provided to the hearables of the user. The user's hearables may utilize active or passive noise cancellation, in order to reduce the level of sound from the environment that reaches the user. In some cases, muted entities may be filtered out actively or passively. For example, as part of a passive filtration, the voices may not be separated and thus not included in the enhanced audio signal. As another example, as part of an active filtration of an entity's voice, a beamforming or learnable model may be used to attenuate a direction of arrival of the entity's voice, a separate audio signal representing the entity's voice may be removed from the enhanced audio signal, or the like.

In some exemplary embodiments, users may be enabled to dynamically activate or mute entities in the environment via the user interface, such as in response to changes in the environment, changes to the position of the user, changes in the preferences of the user, or the like. For example, a user may sit in a restaurant with two or more friends, and may desire to hear the friends, but the user may not desire to hear other people sitting nearby, other people sitting in separate tables, background music and noise, or the like. In this scenario, the acoustic fingerprints of the friends may be applied on noisy audio that is recorded in the restaurant, e.g., by microphones of the mobile device of the user, and may enable to isolate the friends' speech from the noisy audio. The isolated speech, which may be cleaned from undesired sounds, may or may not be amplified, and may be provided to the user's hearables. In case the user dynamically mutes an activated entity, e.g., a friend, the muted friend's speech may not be isolated any more, and may not be included in the signal that is provided to the user's hearables. In some cases, entities may be activated or muted automatically, such as based on whether or not they are estimated to be situated in the environment of the user, whether they are estimated to participate in the conversation the user is involved in, or the like.

In some exemplary embodiments, one or more sounds of interest may be activated as default, by the user, or the like, and may enable to preserve such sounds, if identified in the audio signal. For example, a list of potentially dangerous or important sounds, e.g., an alert sound, may be activated by default. In some exemplary embodiments, the captured audio may be analyzed to identify such sounds in the audio, such as using acoustic signatures of the sounds, using a multimodal audio-text representation model that is trained to represent or generate sounds that correspond to a textual description, an audio classification model, or the like. In some exemplary embodiments, identified sounds may be isolated from the audio and provided to the user's hearables, e.g., together with other isolated voices, by itself, or the like. In some exemplary embodiments, users may be enabled to dynamically adjust the list of sounds of interest, remove therefrom sounds, add thereto sounds, or the like.

In some exemplary embodiments, entities in the environment of the user may be presented in a map view, with or without a respective identifier. For example, in case an identifier of a nearby entity is unknown, the entity may be presented as an unidentified object in the map view, in an estimated location thereof. In some exemplary embodiments, the map view may enable the user to activate or mute entities by mere selections of entities in the map view, to adjust a level of sound from a selected entity, or the like. For example, the map view may be generated based on directions of arrival of activated and non-activated entities in the environment. In some exemplary embodiments, a direction of arrival measurement may indicate a direction that is estimated to be most associated with an extracted voice of the activated entity, a dominant direction of speech, or the like, which may be defined with respect to a defined center or anchor. For example, a direction of arrival may be defined with respect to a location of one or more microphones, a relative orientation among microphones, a location of a mobile device, a location of hearables, or the like.

In some exemplary embodiments, identifiers of entities in the environment of the user may be estimated, determined, or the like, such as based on the profiles of the entities, based on a personal address book of the user, based on a public address book available to the user, based on a social network platform, based on user indications, based on historic vocal communications of the user, based on messaging applications, based on a semantic analysis of a transcription of the conversation, based on calendar events, a combination thereof, or the like. For example, a name of a user's contact may be estimated to be the identifier of the contact.

In some exemplary embodiments, users may be enabled to adjust multiple settings, such as a proportion of the background noise that can be included in an output signal that is provided to the user's hearables, a volume of speech of each of the activated entities, whether or not mobile device sounds should be included, or the like, thereby providing to the user full control of the output audio. For example, a volume of an entity may be adjusted using a filtration mask, or any other signal processing technique.

One technical effect of utilizing the disclosed subject matter is to provide hearables with enhanced functionalities. For example, the disclosed subject matter enables users to gain full control over voice amplifications, by enabling the user to activate or mute desired people in the environment via a user interface of the user's mobile device. In some exemplary embodiments, by providing a mechanism for separating and processing sounds of activated entities, each sound may be processed and controlled independently, together, or the like, providing a full range of functionalities that can be performed on the isolated sounds. For example, increasing a sound of one entity and decreasing a sound of another entity cannot be performed without having independent isolated sounds of both entities.

Another technical effect of utilizing the disclosed subject matter is enabling to separate voices of people in real time, and produce an output audio based thereon in real time (e.g., as part of the online processing described at least on Step 130 of FIG. 1), thus enabling to utilize the disclosed subject matter during a conversation. For example, the disclosed subject matter may enable a user to hear amplified voices of people with which the user is conversing, and to hear reduced volumes (or none at all) of the background noise, which may enhance an experience of the user by providing intelligible audio, reduce cognitive loads from the user, increase an ability of the user to participate in the conversation, or the like.

Yet another technical effect of utilizing the disclosed subject matter is enabling to present a map view of entities in the environment, through which the user may control the sounds of each entity that are provided to the hearables. For example, the map view may present current locations of entities in the environment determined in real time (e.g., locations determined as part of the online processing), near real time locations of entities in the environment (e.g., locations determined as part of the offline processing), adaptive or manually changed locations of entities in the environment, or the like.

Yet another technical effect of utilizing the disclosed subject matter is enabling an automatic or manual identification of people that are conversing with the user.

Yet another technical effect of utilizing the disclosed subject matter is enabling to prioritize some background noises, such as by retaining sounds of interest. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing an exemplary flowchart diagram, in accordance with some exemplary embodiments of the disclosed subject matter. It is noted that although the steps of FIG. 1 are presented as sequential steps, they may not necessarily be performed in a sequential manner. For example, in some cases, Steps 120 and 130 may be performed in parallel, in one or more at least partially overlapping time periods, or the like. In some cases, the various steps may be processed at separate or different time windows, for example when one processing step utilizes the output of another processing step.

On Step 100, a noisy audio signal may be captured from an environment of a user by one or more microphones, e.g., periodically. In some exemplary embodiments, the noisy audio signal may comprise a mixed audio sequence, which may comprise one or more background noises, one or more human voices, one or more non-human voices, or the like. In some exemplary embodiments, the noisy audio signal may have a defined length, such as a defined number of milliseconds (ms), a defined number of seconds, or the like, and noisy audio signals may be captured periodically according to the defined length (e.g., chunks of 5 ms, 10 ms, 20 ms, or the like). In some exemplary embodiments, the noisy audio signal may be captured continuously, periodically, or the like. For example, the noisy audio signal may be captured sample by sample, e.g., without gaps.

In some exemplary embodiments, the noisy audio signal may comprise one or more audio channels that are captured by one or more respective microphones (also referred to as 'mics'). In some exemplary embodiments, the microphones may be in a mobile device of the user such as a smartphone, in a computing device such as a Personal Computer (PC), within hearables, within a wearable device, within a dedicated device, within a dongle connected to a smartphone, or the like. In some embodiments, the computing device may comprise a tablet, a laptop, a user device, an on-board computing system of an automobile, an Internet server, or the like. For example, the microphones may comprise at least three microphones in the mobile device of the user.

On Step 110, the microphones may provide the one or more audio channels of the noisy audio signal, converted to digital data, to a processing unit. For example, the processing unit may comprise a processing unit of the mobile device, a processing unit of the hearables, a processing unit of a computing device, a combination thereof, or the like. In some cases, at least a portion of the processing unit may be positioned in the same device as at least some of the microphones that captured the noisy audio signal. In some cases, at least a portion of the processing unit may be positioned in a different device from the microphones that captured the noisy audio signal.

In some exemplary embodiments, the microphones may provide the noisy audio signal to a processing unit using one or more communication mediums, channels, or the like. In some exemplary embodiments, in case the processing unit is housed in a same device as the microphones, the captured noisy audio signal may be provided to the processing unit via inter-device communications. For example, the captured noisy audio signal may be provided via a lightning connector protocol, a USB Type-C (USB-C) protocol, an MFI connector protocol, or any other protocol. In some exemplary embodiments, in case the processing unit is housed in a different device from the microphones, the captured noisy audio signal may be transferred to the processing unit via a beamforming transmission, or any other transmission that is configured for communication between separate devices.

In some exemplary embodiments, the processing unit may comprise any physical device having an electric circuit that performs a logic operation on input or inputs. In some cases, the processing unit may comprise a dedicated processing unit, such as an independent hardware device, an independent chip or unit, or the like. In some cases, the processing unit may comprise a component of mobile device, a user device, hearables, or the like. In some cases, the processing unit may comprise a portable device that may be mounted or attached to a wearable apparatus, hearables, a computing device, or the like.

On Step 120, the processing unit may apply speech separation on the noisy audio signal, to extract therefrom separate audio signals of activated entities in the environment. In some exemplary embodiments, the speech separation may be performed for one or more entities that are activated, opt-in, enabled, or the like (referred to herein as 'activated entities'). In some exemplary embodiments, the activated entities may comprise human entities, non-human entities, or the like, and may or may not be identified.

In some cases, one or more profiles of entities may be generated, stored, or the like, e.g., in the mobile device, in a remote server, or the like. For example, contacts of the user may be stored in a profile, information associated with people with which the user had vocal communications using the mobile device may be stored in a profile, or the like. In some exemplary embodiments, profiles may or may not comprise an acoustic fingerprint of the respective entity. For example, user data may be analyzed to identify a vocal record of the entity (e.g., extracted from a call), and the vocal record may be processed to generate therefrom an acoustic fingerprint, which may be stored in the profile of the entity. In some exemplary embodiments, profiles may or may not comprise an identifier of the respective entity. For example, a user may have vocal records of an entity, without having any information about the entity, the entity's name, or the like. In some exemplary embodiments, the profiles may be used to enable users to activate or mute entities.

In some exemplary embodiments, entities in the environment may be activated in one or more manners. For example, at an initial stage (when activating an audio processing functionality of the disclosed subject matter), all profiles may be automatically opt-in without user intervention, e.g., unless muted by the user. As another example, profiles of entities may be opt-in if manually selected by the user, e.g., via a user interface enabled by the user's mobile device. As another example, profiles of entities may be opt-in automatically in case they comply, or correspond, to user-selected settings. According to this example, the user may select one or more sounds of interest, contacts of interest, or the like, and the speech separation may be performed to obtain only sounds of the selected entities. In some cases, the user may indicate profiles of one or more sounds or contacts that are not of interest to the user, and such profiles may not be activated, opt-in, or the like.

In some exemplary embodiments, a user may activate an entity via one or more user interfaces of the mobile device. For example, a software application (e.g., a mobile application, a web-based application, or the like) may present the user with profiles of potential non-human sounds of interest, contacts with which the user had vocal communication, contacts that are associated with an acoustic signature, people that are not contacts but are stored with an acoustic signature, contacts with which the user spoke in a recent period (a last timeframe such as a last week or month, or most recent conversations), or the like. According to this example, the user may select to activate entities by selecting people or sounds that she wishes to hear, such as by selecting respective GUI elements including touch screen or physical controls, via a voice command, a textual search bar, or the like. As another example, a map view may be generated to represent entities in the environment (e.g., using a direction of arrival analysis and speech separation techniques), and the user may be enabled to activate or mute represented entities via the map view. In other cases, users may be enabled to activate entities, or their profiles, in any other way.

In some exemplary embodiments, voices of activated entities that are identified in the noisy audio signal may be extracted, e.g., without necessarily processing or analyzing other voices. For example, instead of analyzing the noisy audio signal using general speech separation techniques in order to identify speech components in the noisy audio signal, a matching may be performed between activated entities and the noisy audio signal, without identifying other speech elements in the noisy audio signal. In such cases, the remaining sounds in the noisy audio signal may be treated as background noise, may be ignored, or the like. For example, a matching may be performed between an activated entity and the noisy audio signal by obtaining an acoustic fingerprint of the entity, and extracting from the noisy audio signal a signal that matches the acoustic fingerprint.

In some cases, in case a user activates, for example via a map view, a human entity that has no associated acoustic fingerprint, existing acoustic fingerprints may be applied on the noisy audio signal, to identify an acoustic fingerprint of the entity. For example, acoustic fingerprints that are not associated with a known entity may be executed on the noisy audio signal, and a matched acoustic fingerprint may be added to a profile of the entity. In other cases, a new acoustic fingerprint may be dynamically generated for the activated entity, e.g., by directly recording an enrollment audio record of the activated entity and generating a new acoustic fingerprint based thereon, by performing a general speech separation on the noisy audio signal, or the like. For example, the general speech separation may utilize one or more separation techniques that do not require acoustic fingerprints, e.g., beamforming receiving array, audio source separation techniques, linear filters, Hidden Markov Models (HMMs), Dynamic Time Warping (DTW), Voice Activity Detection (VAD), Blind Signal Separation (BSS), Spectral Subtraction, Wiener Filtering, deep learning models such as Convolutional Neural Networks (CNNs) or Recurrent Neural Networks (RNNs), clustering algorithms, transformers, conformers, or the like. For example, CNNs may be trained to map between audio mixtures and individual sources. In such cases, an acoustic fingerprint may be generated for the activated entity based on an identified voice in the noisy audio signal. For example, the general speech separation may output one or more audio signals associated with unknown speakers, and a user may select which of the unknown speakers is associated with the entity. As another example, the user may select to activate an entity via a map view, and the indicated location of the entity may be used to select which of the audio signals associated with unknown speakers is associated with the entity, e.g., using beamforming techniques. As another example, a number of unknown voices may be recognized in the noisy audio signal, and a temporary profile or cluster (of parts of the audio that are spoken by the same entity) may be dynamically created for each voice. The temporary profile may then be presented to the user, e.g., via the map view, so that the user may decide whether to activate the unknown entity, identify the unknown entity, associate the unknown entity with a contact or profile, or the like. In some cases, the temporary profile may be presented without an identifier of the entity, but may potentially indicate a location of the entity relative to a defined location (such as a location of the user), e.g., based on a direction of arrival of each voice.

In some exemplary embodiments, one or more channels of the noisy audio signal (e.g., captured by respective microphones) may be provided to a speech separation model. In some exemplary embodiments, one or more acoustic signatures of activated entities may be provided to the speech separation model. In some exemplary embodiments, the speech separation model may transform the channels to a frequency domain (e.g., using a Short-Time Fourier Transform (STFT) operation or any other operation), and apply a separation operation thereon, such as in order to extract voices associated with the obtained acoustic signatures from the noisy audio signal. In some exemplary embodiments, the speech separation model may be configured to separate voices of at least a portion of the activated entities. For example, the speech separation model may separate from the noisy audio signal voices of all activated entities, of entities that are estimated in higher chances to be present in the environment (e.g., based on the noisy audio signal, past conversations of the user, calendar events of the user, or the like), of entities that are not muted, or the like. In some exemplary embodiments, the speech separation model may use a generative model to generate and output audio signals of the separated voices or spectrograms thereof. In some exemplary embodiments, the speech separation model may utilize a discriminative mask model that is multiplied by the input to filter out undesired audio.

In some cases, speech separation models may be trained to extract a voice of an entity from a noisy signal using a vocal record of the entity. For example, the vocal record may be obtained by recording the entity with a computing device of the user, from a storage of a computing device (e.g., stored voice messages), or the like. In some exemplary embodiments, the speech separation model may utilize one or more designated speech separation models. For example, the speech separation model may comprise a designated speech separation model for each activated entity (e.g., or at least a portion of the activated entities). According to this example, each designated speech separation model may be configured to extract a voice of the associated entity, and to output a separated voice of the entity that is extracted from the noisy audio signal. In some exemplary embodiments, a designated speech separation model may recognize a voice of the entity and isolate the voice from any remaining voices, sounds, and noise (e.g., the background noise) in the environment of the user. In other cases, a single speech separation model may be utilized for a plurality of activated entities. For example, the single speech separation model may be configured to extract voices of the associated entities, such as by applying a plurality of acoustic fingerprints of the respective plurality of entities on the noisy audio signal. According to this example, the single speech separation model may output a single channel or spectrogram comprising the combined speech by all sounds in the noisy audio signal that are estimated to match the acoustic fingerprints. In some cases, the single speech separation model may be configured to remove reverberation and echoing from the output signal.

It is noted that in some cases, the voice of the user herself may not be separated on this step, e.g., in order to ensure that the user's voice is not echoed, which enhances a user experience of the disclosed subject matter. In some cases, the user's own voice may be separated using an acoustic fingerprint of the user, but may not be opted in and thus not transmitted to the user's hearables. In other models, the user's own voice may be actively removed from the output audio. In some cases, such as in the case of a non-human sound of interest, speech separation models that do not require acoustic fingerprints may or may not be used, e.g., using a sound retrieval model that is trained to retrieve audio based on textual descriptions of the audio, such as the textual description: "Ambulance".

In some exemplary embodiments, one or more verification steps may be performed, e.g., in order to verify that the voice extracted from the speech separation model is indeed the voice of the respective entity. For example, a verification may be useful in case a voice of an activated entity is not included in the noisy audio signal, in case the speech separation model matched the obtained fingerprint with a wrong voice (e.g., a similar voice) in the noisy audio signal, or the like. In some exemplary embodiments, extracted audio signals, that are provided by the speech separation models, may be verified, such as by using a verification module. In some exemplary embodiments, at least one verification module may be used for each respective speech separation model that is executed. In some exemplary embodiments, the verification module may be configured to obtain one or more channels of the noisy audio signal, an acoustic fingerprint of the respective entity, the extracted audio signal (e.g., a single channel), or the like, and to verify that the fingerprint corresponds to the extracted audio signal. In some cases, the extracted audio signal may not be received or utilized by the verification module, and instead, the verification module may obtain the noisy audio signal, along with an acoustic fingerprint of the respective entity and/or a direction of interest of the respective entity. In such cases, the verification module may indicate, for each chunk of noisy audio signal that is captured in the environment, whether or not the entity represented by the acoustic fingerprint is vocally present in the noisy audio signal, whether the noisy audio signal arrives from the indicated direction of interest, or the like.

In case the verification stage is not complied with (if the entity is not vocally present in the noisy audio signal, or is not associated with the indicated direction of interest), this may indicate that the speech separation model extracted a wrong sound. In some exemplary embodiments, the verification module may output an indication of success or failure. For example, the verification module may output a value of one in case of successful verification, and a value of zero otherwise. As another example, the verification module may generate a continuous score, e.g., a confidence score, indicating a probability that the entity is vocally present in the noisy audio signal. According to this example, the generated values may be separated by the verification module to a value of zero, when a value is lesser than a threshold, and to a value of one, when the value is greater than (or equal to) the threshold. In other cases, indications of whether or not the verification was successful may be provided in any other way, e.g., using different values. In some exemplary embodiments, the output of the verification module may be used as a filtration mask, thus enabling to filter out extracted voice from the speech separation model that are not verified. For example, the output value of the verification module may be multiplied with the extracted voice from the speech separation model, causing the extracted voice to be filtered out in case the verification is unsuccessful.

In some exemplary embodiments, in case more than one speech separation model and respective verification module are executed, the models may be executed concurrently, in at least partially overlapping timeframes, in separate timeframes, or the like, such as in order to obtain one or more verified separated audio signals that are extracted from the noisy audio signal. In other cases, such as in case the extracted sounds are not verified with a sufficiently high confidence score (e.g., above a threshold), or in case that none of the separated audio signals are successfully verified, the extracted sounds may be disregarded, and the enhanced audio signal may be generated in a different manner, e.g., by removing background noise, using beamforming receivers, or the like. For example, a neural network may be trained to extract human speech from background noise. In some exemplary embodiments, in case at least one separated audio signal is successfully verified, the verified separated audio signals may be processed and combined in one or more manners, e.g., according to Step 130.

On Step 130, separated speech of activated entities may be processed, e.g., in order to enable the user to control an output based on the separate audio signals. In some exemplary embodiments, the processing unit may perform one or more processing operations on the separate audio signals, such as combining the separate audio signals, amplifying one or more separate audio signals, attenuating one or more separate audio signals, limiting an overall volume of a combined audio signal, adjusting the audiogram of the combined audio signal in accordance with the user's hearing profile, applying filtration masks on the separate audio signals to attenuate or amplify one or more signals, enabling the user to adjust a volume of the background noise, enabling the user to adjust one or more parameters, applying audio compression or other DSP operations, or the like.

In some exemplary embodiments, amplification may be accomplished digitally, such as by changing one or more parameters of the microphones, using a beamforming microphone array, or the like. In some exemplary embodiments, additional processing of the separate audio signals may comprise changing a pitch or tone of the separate audio signals (e.g., in case the user is less sensitive to tones in a certain range), mapping the separate audio signals to higher or lower frequencies, changing a rate of speech of the separate audio signals (e.g., using phase vocoder or other learnable time stretching methods), introducing pauses or increased durations of pauses between words and/or sentences of the separate audio signals, or the like.

In some exemplary embodiments, processing of the separate audio signals may be performed online or offline. In some exemplary embodiments, online processing may refer to processing of the noisy audio signal with a zero or minimal accumulated delay, for example below a threshold, such that the user may be enabled to participate in a conversation using the processed outputs that are based on the noisy audio signal. In some exemplary embodiments, offline processing may refer to non-real-time processing, near real time processing, or the like, which may have an increased accumulated delay compared to the online processing. For example, online processing may have an overall delay threshold of five milliseconds (ms), ten ms, twenty ms, or the like, while offline processing may have an overall delay threshold of one minute, two minutes, or the like. In some cases, certain operations such as speaker diarization (during which unknown speakers are automatically segmented and identified in audio) or identifying the presence of unknown entities in audio signals, may be performed more efficiently in retrospect (not necessarily due to computational overload, but due to more information being available), and may be performed as part of the offline processing. For example, such operations may utilize a longer time window than other operations, enabling the operations to be performed with higher confidence scores of entity identifications.

In some exemplary embodiments, Step 131 may be performed as part of the online processing, while Steps 132, 133, 134, and 135 may be performed as part of the offline processing. In other cases, Step 131 may be performed as part of the offline processing.

On Step 131, selections of activated entities may be adjusted. In some exemplary embodiments, the user may be enabled to dynamically change the selection of activated entities in real time, e.g., via the user interface of the mobile device. For example, the user may select to activate an entity in the map view in case the entity joins a conversation of the user, and then deselect the entity, causing the entity to be muted, such as in case the entity leaves the conversation, bothers the user, or the like. In some cases, selections of activated entities may be adjusted automatically, such as upon identifying that an activated entity left the environment of the user (e.g., using the DoA calculation of Step 133). As an example, a person may be opted in automatically, in response to identifying that an activated entity referred to the person by name.

In some exemplary embodiments, the processing unit may obtain user selections, and provide them to the speech separation model, e.g., as part of the online processing. For example, in response to an indication that Alice is not activated any more, the speech separation model may terminate a designated speech separation model of Alice, a designated verification module of Alice, or the like, e.g., in a next iteration of the flowchart of FIG. 1.

On Step 132, as part of the offline processing, one or more activated entities may be identified. In some exemplary embodiments, in case an activated entity is not identified, or is wrongly identified, the identifier of the entity may be estimated. In some cases, the user may be prompted to confirm or reject the estimated identity of one or more entities, e.g., in case a confidence score of an estimation is below a threshold. In some cases, the user may directly edit an identifier (a name of the entity) of an entity, e.g., in case the estimated identity is inaccurate. In some exemplary embodiments, in response to a user's activation of a contact, the processing unit may estimate an identifier of the contact, such as his name. For example, in case the contact is stored in association with a name, a title, or the like, the processing unit may estimate that the name of the contact is the identifier of the contact. In some exemplary embodiments, in case that the contact is not stored in association with a name, or in case the entity is not a contact of the user's mobile device, other methods may be used to estimate an identifier of the entity.

As an example, an identifier of an entity may be estimated by analyzing one or more subsequent noisy audio signals with a semantic analyzer. The semantic analyzer may be configured to identify names used in a conversation of the user, associate the names with directions of arrival of different voices, and estimate matches between names and profiles of the respective voices. According to this example, the semantic analyzer may be applied to a transcription of the conversation, which may be extracted using Automatic Speech Recognition (ASR), computer speech recognition, speech-to-text models, or the like.

As another example, an identifier of an entity may be estimated based on historic data. In some cases, a conversation of the user may be correlated to historic conversations of the user, to extract one or more contexts therefrom. An historic analysis may reveal clusters of speakers that tend to have conversations together. For example, the user may usually meet with Alice together with Bob. According to this example, in case Bob is identified as speaking in the noisy audio signal, a temporary profile of an unknown voice may be estimated to belong to Alice. As another example, historic analysis may reveal that the user usually speaks during conferences with Alice, and during holidays with Bob. Such information may be correlated with current dates (e.g., obtained from remote servers, a clock of the mobile device, or the like), with holiday dates, with transcriptions of the conversation, or the like, in order to estimate whether the user is participating in a conference or celebrating a holiday, based on which the identifier may be selected to be Alice or Bob.

As another example, an identifier of an entity may be estimated based on recent activities of the user. For example, an activity log of the user may indicate that the last people with which the user spoke were Alice, Bob, and Charlie, and the processing unit may estimate that the current entities in the environment of the user are correlated with the last people with which the user spoke.

As another example, an identifier of an entity may be estimated based on a calendar event of the user. For example, a calendar event of the user may indicate that the user is currently participating in a meeting with Alice and Bob, which may increase the probability that an identifier of an unrecognized entity is either Alice or Bob.

In some cases, a probability that an entity is associated with one or more identifiers may be calculated based on a combination of one or more weighted or unweighted metrics, and an identifier with a highest probability may be utilized as the identifier of the entity, suggested as the identifier of the entity, or the like. For example, the processing unit may determine that the last people with which the user spoke were Alice, Bob, and Charlie, and that usually the user speaks separately with Alice and Bob, and separately with Charlie. In such cases, identifying that one of the activated entities is Bob, may be used to infer that the unidentified entity is Alice. As another example, a list of one or more identifiers with a highest matching score may be presented to the user in association with an unrecognized entity, and the user may select the correct identifier from the list.

In some exemplary embodiments, an identifier of an activated entity may not always be estimated, suggested, or the like. For example, a temporary profile with a dynamically generated acoustic fingerprint may be generated for an unrecognized person, e.g., a waiter in a restaurant, and in case the temporary profile is not identified in the noisy audio signals for more than a defined time period, an estimation of a respective identifier may not be performed.

In some cases, the user may be provided with suggestions to mute or activate one or more entities. For example, in case a semantic analyzer estimates that an activated entity is participating in a different conversation from the user, the processing unit may suggest to the user to mute the activated entity. As another example, in case a semantic analyzer estimates that a non-activated entity joined a conversation of the user, the processing unit may suggest to the user to activate the entity.

On Step 133, in order to provide to the verification module of Step 120 a direction of interest, one or more beamforming receiving arrays or learnable methods (such as neural networks that are trained for DoA estimation) may be utilized by the processing unit to estimate a Direction of Arrival (DoA) of the entity. In some exemplary embodiments, the processing unit may determine a dominant direction of the noisy signal. In some exemplary embodiments, the DoA model may obtain, as input, one or more channels of the noisy audio signal as captured by respective beamforming receivers, a separated audio signal that was separated and/or verified by one or more speech separation models and verification module, a signature of the entity, or the like.

In some exemplary embodiments, the DoA model may estimate a dominant direction of the channels of the noisy audio signal, such as by applying a beamformer on each angle, on each set of angles, or the like, and determining a score for the angle. For example, 360 scores may be determined for every angle, 90 scores may be determined for every set of four adjacent angles, or the like. In some exemplary embodiments, a dominant angle may be determined based on the score, e.g., by selecting a highest score, a highest average score for a set of adjacent angles, or the like. For example, the DoA model may compare the relative timing, amplitudes, or the like, of captured voices to determine a directionality. In some exemplary embodiments, a score may be assigned to a single angle, denoted by $\theta$, or to a range of angles. In some cases, a score may not be calculated for one or more angles or angle ranges, e.g., in case a probability that they are relevant is determined to be low.

In some exemplary embodiments, the DoA model may verify that the dominant angle is associated with the respective entity, such as by comparing the separated audio signal to the acoustic signature of the entity, and ensuring that they match. In some exemplary embodiments, the verification performed by the DoA model may overcome one or more drawbacks. For example, in case voices of a plurality of people is obtained from a same direction, which reduces the ability to separate the voices, verifying that the voice complies with the respective acoustic fingerprint may ensure that the voice separation is performed properly. In some exemplary embodiments, the verification operation may be performed by the DoA model in case a dominant angle is found. In some cases, one or more smoothing operations may be performed over the dominant angle.

In some exemplary embodiments, in case the dominant angle is verified as being associated with the respective entity, the angle or range of angles may be provided to the verification module of Step 120, such as in order to determine a correct filtration mask for the separated audio signal. In some exemplary embodiments, in case the dominant angle is not verified, the dominant direction may be disregarded, e.g., providing a NULL value to the verification module of the entity. Additionally, or alternatively, the separated audio signal may be compared to other acoustic signatures of other activated entities, such as in order to identify which entity is vocally present in the noisy audio signal, and to provide the dominant direction to the DoA model of the correct entity. In some cases, such as in case that no activated entity is speaking in the noisy audio signal, no dominant angle may be provided by the DoA model.

In some exemplary embodiments, DoAs may be adjusted or calibrated periodically, such as every time that a different entity is separated from the noisy audio signal, every defined time period, by user request, or the like. In some cases, DoAs may be calculated for non-activated entities, e.g., at a lower rate. For example, voices of entities that were muted by the user, that were not activated by the user, or the like, may be identified in a noisy audio signal, and their DoA may be monitored, such as in order to present them in the map view, in order to increase a speed of separating their voice in case the user activates these entities, or the like. For example, a latency of verifying a separated voice of an entity that is activated may be reduced, in case a DoA of the entity is known, e.g., as described in FIG. 6B. In some exemplary embodiments, DoAs of activated entities may be calculated in a higher frequency than DoAs of non-activated entities. For example, if DoAs of activated entities are calculated every minute, DoAs of non-activated entities may be calculated every five minutes. In some cases, DoAs of an entity may be calculated based on a number of times that the entity's voices appears in the noisy audio signals. For example, every 5, 10, 20 times, or the like, that the entity's voices appears in the noisy audio signals, a new DoA may be calculated for the entity, e.g., unless a defined time duration has elapsed since the last calculation. In some cases, different DoA estimation resolutions, such as angle range bins, may be assigned to different entities. In some cases, a DOA angle assigned to an entity may be provided to the speech separation model of the same entity.

On Step 134, a map view that is presented on a user interface of the mobile device may be adjusted, e.g., based on changes in a Direction of Arrival (DoA) of one or more entities. In some exemplary embodiments, the map view may display locations of entities in the environment of the user, relative to a location of the user, a location of the mobile device, a location of one or more microphones, or the like. In some cases, the 'location of the user' may refer to any location that is associated to the location of the user, such as the location of the mobile device of the user, the location of a wearable device of the user, or the like. In some exemplary embodiments, the map view may be created and adjusted based on captured audio signals, acoustic fingerprints, periodically determined DoAs associated with one or more entities, or the like.

It is noted that the verification module and the speech separation model described on Step 120 may be utilized as part of the online processing, e.g., during every iteration of the flowchart of FIG. 1, while the DoA model may be utilized as part of the offline processing. In other cases, the DoA model may be utilized as part of the online processing.

On Step 135, acoustic signatures of one or more entities may be enhanced, generated, or the like, e.g., as part of the offline processing. For example, noisy audio signals may be obtained and used to enhance an associated acoustic signature, generate a new acoustic signature, or the like. For example, the existing acoustic signature may be adjusted to take into account the voice of the entity as perceived in the noisy or enhanced audio signal.

On Step 140, an enhanced audio signal may be outputted, e.g., to hearables of the user, a hearing aid device, a feedback-outputting unit, or the like. In some exemplary embodiments, the enhanced audio signal may be processed, combined, and provided to hearables of the user, e.g., where the output signal may be reconstructed. In some exemplary embodiments, the processing unit may be configured to communicate the enhanced audio signal via one or more communication means, such as Bluetooth™. In some exemplary embodiments, the enhanced audio may undergo audio compression, audiogram adjustment according to the user, constant amplification or attenuation, gain adjustment, or the like.

In some exemplary embodiments, the enhanced audio signal may comprise a combination of the separate audio signals, one or more non-activated entities, background noises of one or more types, or the like. In some exemplary embodiments, the user may be enabled to adjust the audio settings in a way that allows her to hear a specific proportion of the background noise and the separate audio signals. For example, the user may select to hear a ratio of one-third of the background noise and two-thirds of the separate audio signals.

In some exemplary embodiments, the hearables may comprise a speaker associated with an earpiece, which may be configured to output, produce, synthesize, or the like, the enhanced audio signal. In some exemplary embodiments, the generated enhanced audio signal may enable the user to hear activated speakers, without necessarily hearing any non-activated speakers, background noise, or the like. In some exemplary embodiments, iterations of the flowchart of FIG. 1 may be performed continuously, such as to enable a conversation of the user to flow naturally.

In some exemplary embodiments, the method of FIGS. 2-5 may be performed in a noisy environment of a user. In some cases, the noisy environment may comprise a plurality of people participating in at least one conversation. In some exemplary embodiments, the user may have a mobile device used at least for obtaining user input, and at least one hearable device such as hearables used for providing audio output to the user.

Figure 2:
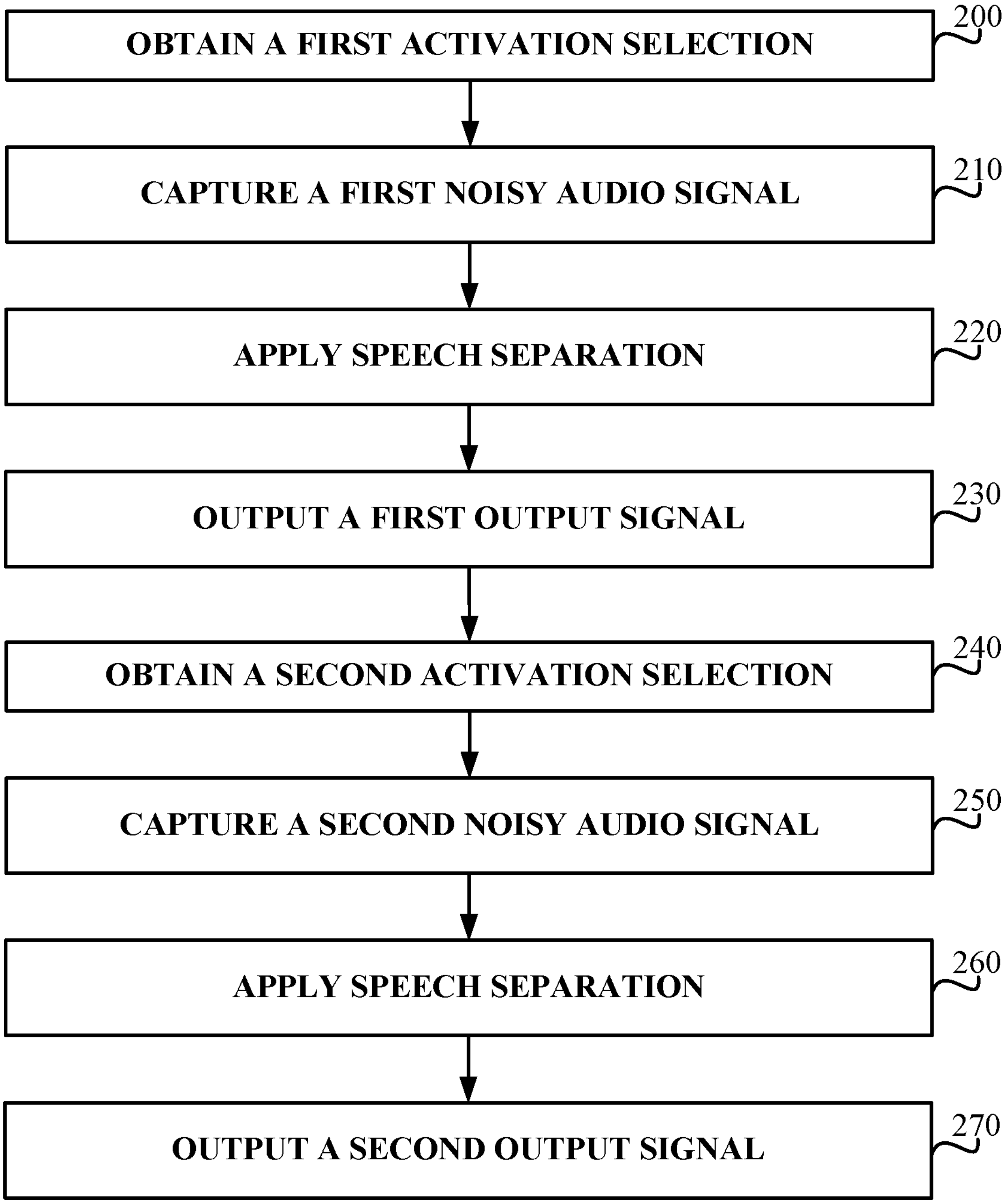
FIG. 2 shows an exemplary flowchart diagram of a method, in accordance with some exemplary embodiments of the disclosed subject matter.

Referring now to FIG. 2 showing an exemplary flowchart diagram of a method, in accordance with some exemplary embodiments of the disclosed subject matter.

On Step 200, a first activation selection of a first person in the user's environment may be obtained. In some exemplary embodiments, the environment may comprise a plurality of people participating in at least one conversation, including a first person and a second person. For example, both first and second persons may not be activated.

In some exemplary embodiments, the first activation selection may be configured to activate the first person, and may be performed by the user via the mobile device. For example, the user may be presented with a map view depicting the plurality of people, and may select the first person via the map view. As another example, the user may by presented with a list of profiles of entities such as user contacts, and may select the first person from the list. In other cases, the selection of the first person may be performed in any other way, such as automatically. For example, an intention of the user may be estimated automatically, such as based on a sematic analyzer determining that the first person is participating in a conversation of the user, and the first person may be activated in response.

On Step 210, a first noisy audio signal may be captured from the environment. In some exemplary embodiments, the first noisy audio signal may comprise one or more human sounds, one or more non-human sounds, one or more background sounds, or the like. In some exemplary embodiments, the first noisy audio signal may be captured by a single microphone, by multiple microphones (e.g., a beamforming microphone array), or the like. For example, a single channel may be obtained in case of a single microphone, and multiple channels may be obtained in case of multiple microphones, respectively.

On Step 220, speech separation may be applied on the first noisy audio signal to extract a first audio signal associated with the first person. For example, the speech separation may be performed according to Step 120 of FIG. 1.

In some exemplary embodiments, the speech separation may be configured to convert the first noisy audio signal into a frequency domain, thereby obtaining a converted first noisy audio signal. For example, the conversion may utilize an STFT operation. In some exemplary embodiments, the converted first noisy audio signal may be processed to extract therefrom the first audio signal. For example, the first audio signal may be extracted using an acoustic fingerprint of the first person, such as by identifying that the speech of the first person in the first audio signal matches the acoustic fingerprint of the first person, and isolating the speech. For example, the first audio signal may be extracted using a trained model such as a sequence-to-sequence (seq2seq) model that was trained to receive as input an acoustic fingerprint and an audio signal, and extract speech that corresponds to the acoustic fingerprint from the audio signal. In some exemplary embodiments, the first audio signal may comprise an audio signal, a spectrogram, or the like. In some cases, any other voice signature may be utilized instead of the acoustic fingerprints or in addition thereto.

In some exemplary embodiments, the first and second acoustic fingerprints may be generated based on respective first and second audio records of corresponding people, e.g., past vocal communications with the user, a designated enrollment audio, a social media platform, or the like. In some exemplary embodiments, the first and second acoustic fingerprints may be retained in a database of pre-generated acoustic fingerprints, may be dynamically generated during the conversation, or the like.

In some exemplary embodiments, after extracting the first audio signal, the first audio signal may be verified. In some exemplary embodiments, the first audio signal may be multiplied with a filtration mask with a value of zero or one, indicating whether or not the first audio signal is verified. In some exemplary embodiments, the value of the filtration mask may be determined based on an estimation of whether or not the first audio signal comprises the voice of the first person, e.g., based on the acoustic fingerprint of the first person, based on the converted first noisy audio signal, based on a direction of arrival of speech from the first person, or the like.

On Step 230, a first output signal may be generated and outputted to the user via the hearables. For example, the first output signal may be transmitted to the hearables from the user's mobile device, from a different processing unit, or the like, enabling the hearables to obtain the first output signal and reconstruct the first output signal (e.g., using speakers). In some exemplary embodiments, the first output signal may comprise at least the first audio signal, e.g., since the first person may be activated, and since the first noisy audio signal may comprise speech of the first person. In some cases, the first output signal may comprise other voices, such as speech of another activated entity.

In some exemplary embodiments, the first output signal may enable the user to hear the desired entities with an enhanced intelligibility, clarity, audibility, or the like, at least since the first output signal may amplify voices of activated entities, may not provide voices of non-activated entities, or the like. For example, a voice of the second person may not be included in the first output signal. In some exemplary embodiments, while the first person is activated, and the second person in not activated, the first output signal may enhance the voice of the first person and reduce an audibility of a voice of the second person. For example, this may be the case for a first duration of a conversation.

In some exemplary embodiments, the first output signal may enable the user to hear background sound in a reduced capacity, to remove background sounds, or the like, e.g., by not including the background sounds in the first output signal. For example, a background sound may comprise a voice of non-activated people such as the second person, a sound of a non-activated non-human entities, or the like. In case a certain proportion of the background sound is set (e.g., by the user) to be provided in the first output signal, the first output signal may be generated to include a portion of the remaining first noisy audio signal.

On Step 240, a second activation selection of the second person may be obtained. In some exemplary embodiments, the second activation selection may be configured to activate the second person, and may be performed by the user via the mobile device, e.g., similarly to Step 200. In some exemplary embodiments, the second activation selection may be performed via a map view displayed on the mobile device, which may indicate locations of at least a portion of the plurality of people in the environment, relative to a location of the user.

On Step 250, a second noisy audio signal may be captured from the environment of the user, e.g., similarly to Step 210.

On Step 260, speech separation may be applied on the second noisy audio signal to extract from the second noisy audio signal a second audio signal associated with the second person, e.g., similarly to Step 220.

On Step 270, a second output signal may be generated and outputted to the user, via the hearables, e.g., similarly to Step 230. In some exemplary embodiments, the second output signal may comprise at least the second audio signal, e.g., since the second person may be activated, and since the second noisy audio signal may comprise speech of the second person. In some cases, the second output signal may comprise other voices, such as speech of another activated entity, e.g., speech of the first person.

In some exemplary embodiments, the second output signal may enable the user to hear the activated entities with enhanced intelligibility, clarity, audibility, or the like, at least since the second output signal may amplify voices of activated entities, may not provide voices of non-activated entities, or the like. In some exemplary embodiments, the audibility of the voice of the second person may be enhanced during a second time duration, e.g., subsequent to the first duration. In some exemplary embodiments, in case the second output signal comprises also speech of the first person (e.g., a respective audio signal), the audibility of the voices of the first and second persons may be enhanced for the second duration.

In some exemplary embodiments, in addition to activating entities, the user may be enabled to mute entities. For example, the user may select to mute the first person, e.g., before the second activation selection. In response to a muting selection of the first person, the second output signal may be generated to not include, exclude, or the like, an audio signal associated with the first person, thereby reducing the audibility of the voice of the first person for the second duration.

Figure 3A:
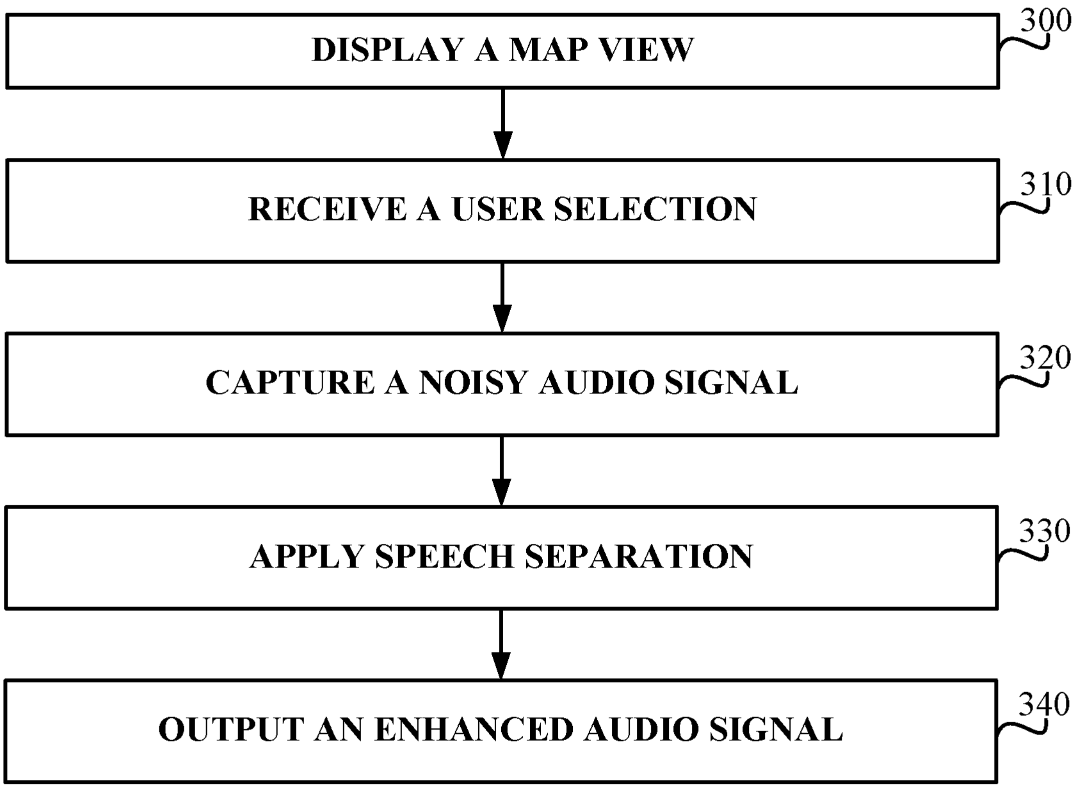
FIG. 3A shows an exemplary flowchart diagram of a method, in accordance with some exemplary embodiments of the disclosed subject matter.

Referring now to FIG. 3A showing an exemplary flowchart diagram of a method, in accordance with some exemplary embodiments of the disclosed subject matter.

On Step 300, a map view may be generated and displayed to the user, e.g., via the mobile device. In some exemplary embodiments, the map view may depict locations of one or more entities in the environment of the user, relative to a location of the user (e.g., a location of the mobile device), a location of the microphones, a location of the hearables, or the like. In some cases, the map view may depict indications of activated sounds of interest, such as via a side panel, a bottom panel, a cloud image, or the like.

In some exemplary embodiments, the map view may be generated, manually or automatically, based on a direction of arrival analysis of voices in one or more audio signals captured from the environment. In some exemplary embodiments, the direction of arrival analysis may be performed using a beamforming receiver array, a learnable probabilistic model such as a neural beamformer, or the like. In some exemplary embodiments, during direction of arrival analysis, a direction of arrival may be measured in all directions, such as in order to find a most probable direction from which each voice originated. In some exemplary embodiments, the direction of arrival analysis may be applied for one or more identified voices in the captured audio signal, e.g., separately, together, or the like.

In some exemplary embodiments, the map view may be generated to comprise identifiers of one or more of the plurality of people, of other entities, or the like. In some exemplary embodiments, an identifier of an entity may be determined based on user indications. For example, an identifier of an unrecognized entity (e.g., the target person) in the map view may be received from the user, and the map view may be updated to display the identifier adjacently to a map object representing the unrecognized entity. The unrecognized entity may or may not comprise a human entity.

In some exemplary embodiments, an identifier of an entity may be determined based on a profile of an unidentified entity, an acoustic signature of an unidentified entity, contact information, or the like. For example, a voice of an unidentified entity from the plurality of people may be obtained, and matched with a stored acoustic fingerprint of a person. According to this example, an identifier of the unidentified entity may be extracted based on the matching, e.g., based on a title of the acoustic fingerprint, profile, contact information of the respective contact, or the like. As another example, in case that an acoustic fingerprint of an unidentified entity does not match stored fingerprint, an identifier for the fingerprint may be determined, e.g., based on a user indication, an estimated identifier as estimated by a sematic analyzer, or the like. In some cases, identifiers of entities may be retained in a database with pairs of identifiers and matching pre-generated acoustic fingerprints, enabling a swift extraction of the identifier for every matched fingerprint.

In some exemplary embodiments, acoustic fingerprints may be obtained from past vocal communications of the user, and may be stored independently, within a profile, within a contact record, or the like. In some exemplary embodiments, the past vocal communications with the user may comprise voice messages transmitted via an Instant Messaging (IM) service, a Voice over IP (VoIP) service, a social network platform, or the like. In some exemplary embodiments, the past vocal communications with the user may include voice messages are obtained from a WhatsApp™ application, a WeChat™ application, past video communications, a media-sharing platform, a social network platform, or the like.

In some exemplary embodiments, an identifier of an entity may be determined based on contact information of the entity, which may be obtained from a personal address book of the user, a public address book available to the user, a contact record that is stored in the mobile device externally to the personal address book, a social network platform, or the like.

In some exemplary embodiments, an identifier of an entity may be determined based on a calendar event of the user. For example, the calendar event may indicate an identity of a person, and an unrecognized entity may be estimated to correspond to the person, e.g., in case an acoustic signature of the person is not available.

In some exemplary embodiments, an identifier of an entity may be determined in any other way, and used to adjust the map view. In other cases, identifiers of entities may be calculated for other purposes, such as for providing the user with a list of entities to activate, without necessarily using a map view.

On Step 310, a user selection of a target person from the map view may be received from the user, via the mobile device. For example, the user may press on the target person, use a vocal or textual command to select the target person, or the like. In some exemplary embodiments, the selection may comprise an activation selection, e.g., causing the target person to be activated in case the user wishes to hear the target person. In other cases, the selection may comprise a muting selection, e.g., causing the target person to be deactivated, muted, or the like.

On Step 320, a noisy audio signal may be captured from the environment, e.g., similarly to Step 210 of FIG. 2.

On Step 330, the noisy audio signal may be processed at least by applying one or more speech separation models, to isolate one or more sounds. For example, in case the user selection was an activation selection, a speech separation model of the target person may be applied on the noisy audio signal, and in case the voice of the target person is identified in the noisy audio signal, the voice may be isolated, extracted, or the like. In some cases, speech separation models of any other activated entities may be applied on the noisy audio signal.

In some exemplary embodiments, the isolated speech signals that are extracted by the speech separation models from the noisy audio signal may be processed, combined or the like, to generate an enhanced audio signal. In some exemplary embodiments, in case the noisy audio signal includes the voice of the target person, the enhanced audio signal may be generated to include at least the voice of the target person, e.g., since the user activated the target person. In other cases, such as in case the selection included a muting selection, speech separation of the target person may not be performed, resulting with the enhanced audio signal excluding a voice of the target person.

On Step 340, the enhanced audio signal may be provided to the user's hearables, and outputted to the user via the hearables, e.g., similarly to Step 230 of FIG. 2.

In some exemplary embodiments, the map view may be automatically adjusted, e.g., by measuring DoAs every defined timeframe and adjusting the map view accordingly, in response to identifying one or more events (e.g., an entity spoke after being quiet for more than a defined timeframe), or the like. In some exemplary embodiments, the map view, as well as the directions of arrival measurements, may be updated as part of the offline processing. For example, during a direction of arrival analysis (e.g., based on one or more noisy audio signals), an original direction of arrival of a voice of a person in the environment may be determined. In some exemplary embodiments, the map view may be generated based on the original direction of arrival, to depict a relative location of the person as calculated by the direction of arrival analysis. In some cases, after determining the original direction of arrival, one or more second noisy audio signals may be captured in the environment, and a second direction of arrival of the voice of the person may be inferred therefrom. For example, the second direction of arrival may be different from the original direction of arrival of the voice of the person. In such cases, the map view may be updated to reflect the modified relative location of the person based on the second direction of arrival, whereby presenting an updated map view with an up-to-date relative location of the person.

In some exemplary embodiments, directions of arrival may be calculated differently for activated and non-activated entities. For example, a direction of arrival of a non-activated entity may be measured every first time period, while a direction of arrival of an activated entity may be measured every second time period, e.g., the first time period is greater than the second time period. For example, the first time interval may be five minutes and the second time interval may be ten minutes. In other cases, any other configuration may be used, e.g., directions of arrival may be calculated at same intervals regardless of whether the entities are activated or not. In some exemplary embodiments, setting time intervals for measuring directions of arrival may not necessarily provide inaccurate map views, even if the time intervals are large (e.g., greater than a threshold), e.g., since entities may typically not move a lot during a conversation. In some exemplary embodiments, setting larger time intervals for measuring directions of arrival may save computational power, battery, processing time, or the like.

Figure 3B:
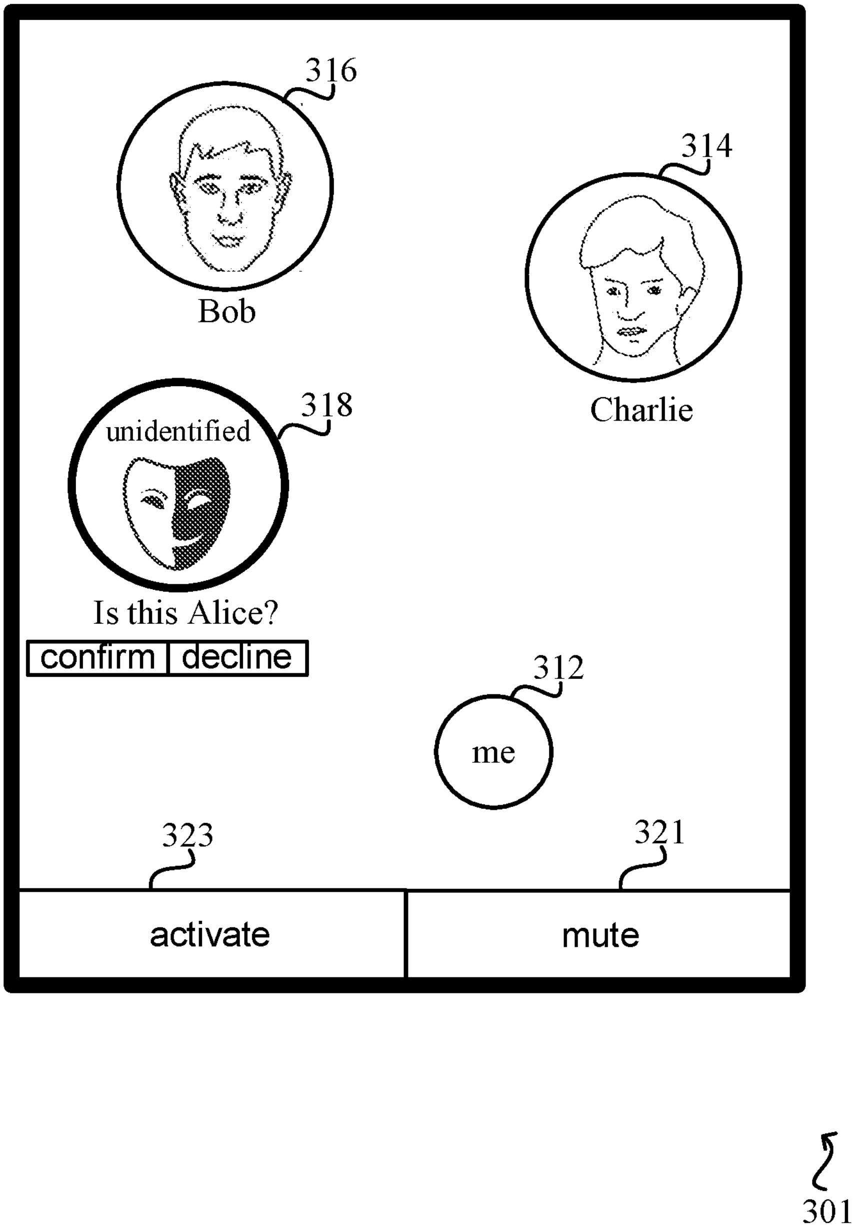
FIG. 3B shows an exemplary map view, in accordance with some exemplary embodiments of the disclosed subject matter.

Referring now to FIG. 3B showing an exemplary map view, in accordance with some exemplary embodiments of the disclosed subject matter.

Figure 6A:
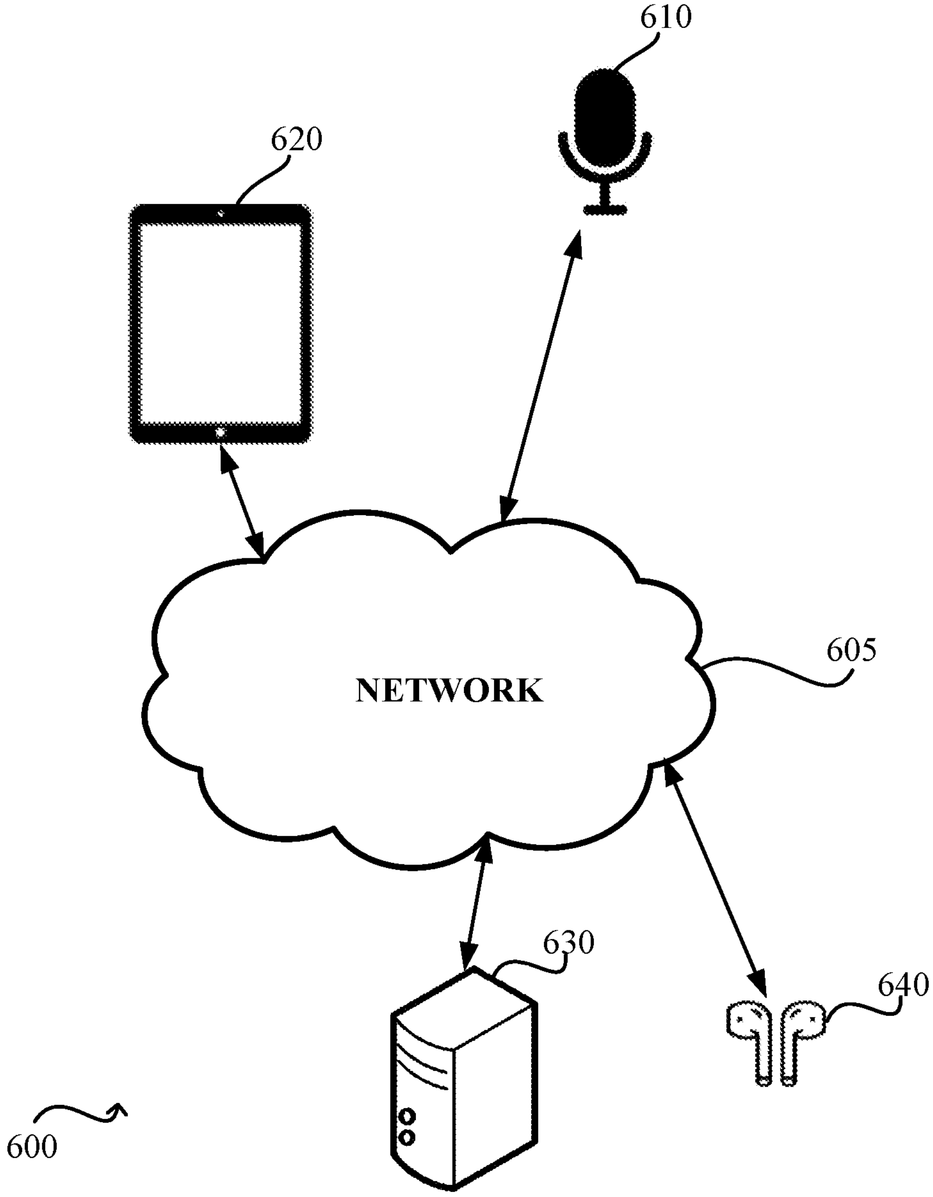
FIG. 6A shows a schematic illustration of an exemplary environment in which the disclosed subject matter may be utilized, in accordance with some exemplary embodiments of the disclosed subject matter.

In some exemplary embodiments, as depicted in FIG. 3B, Map View 301 may be generated and displayed to the user, e.g., on a display of a mobile device such as Mobile Device 620 of FIG. 6A. In some exemplary embodiments, Map View 301 may depict a location associated with the user, e.g., Location 312, which may comprise a location of a mobile device of the user, a location of a wearable of the user, a location of hearables of the user, or the like. For example, Location 312 may be estimated using a location sensor, a direction of arrival estimation, or the like. In some exemplary embodiments, Map View 301 may depict locations of one or more activated or non-activated entities in the environment of the user, such as Locations 314, 316, and 318. In some cases, the user may be enabled to modify locations of entities, such as by dragging them around Map View 301, e.g., in case their depicted location is inaccurate.

In some exemplary embodiments, in case an identifier of an entity in Map View 301 is known, Map View 301 may depict the identifier, such as by presenting a textual indication of the identifier adjacently to the respective location (denoted 'Bob' and 'Charlie'), by presenting a visual indication of the identifier adjacently to the respective locations (denoted photographs of Bob and Charlie), or the like. For example, photographs of entities may be automatically extracted from their profile, contact records, social media profile, or the like, and presented in association with the respective locations. In other cases, photographs of entities may be manually captured by the user such as via Mobile Device 620, and presented in Map View 301. In some cases, an object depicted at Location 312, representing the user, may also depict an identifier of the user such as the user's name, image, or the like. In some exemplary embodiments, in case an identifier of an entity in Map View 301 is unknown, the respective object may remain blank, may be populated with a default identifier (e.g., the mask and 'unidentified' string at Location 318), or the like. In some cases, in case an identifier of an entity in Map View 301 is unknown, the identifier may be estimated automatically, e.g., according to Step 300 of FIG. 3A, Step 420 of FIG. 4, or the like. For example, Location 318 may be associated with an unidentified entity, which may be estimated to be Alice. In such cases, the user may be prompted to confirm or decline the identifier 'Alice', the estimated identifier 'Alice' may be automatically set, or the like.

In some cases, in case a location of an identified or unidentified entity cannot be determined, the entity may be represented at a predetermined location of Map View 301, of the display of Mobile Device 620, or the like (not depicted), such as at the bottom of the screen of Mobile Device 620. In some cases, background noise or non-human sounds may be indicated visually in Map View 301, such as presenting a predetermined symbol in Map View 301 (not depicted). For example, the predetermined symbol may comprise a cloud at a predetermined location, such as the center of the display, or at any other position.

In some exemplary embodiments, the user may be enabled to activate or mute entities via Map View 301. For example, the user may select an entity by pressing on the respective object in Map View 301, indicating the entity via its identifier or relative position using a vocal command, or the like. A graphical display of selected entities may or may not be adjusted, such as by increasing a width of an outer line of the selected entity (e.g., as depicted with Location 318), or in any other way, e.g., by changing a color of the selected entity. In some exemplary embodiments, selected entities may be muted or activated, such as by selecting the GUI Elements 321 or 323. For example, GUI Elements 321 or 323 may be presented to the user upon selecting Location 318. In other cases, any other manipulation may be performed for selected entities, e.g., enabling the user to change a volume of the selected entity, to change an identifier of the entity, to change its location in Map View 301, or the like.

Figure 4:
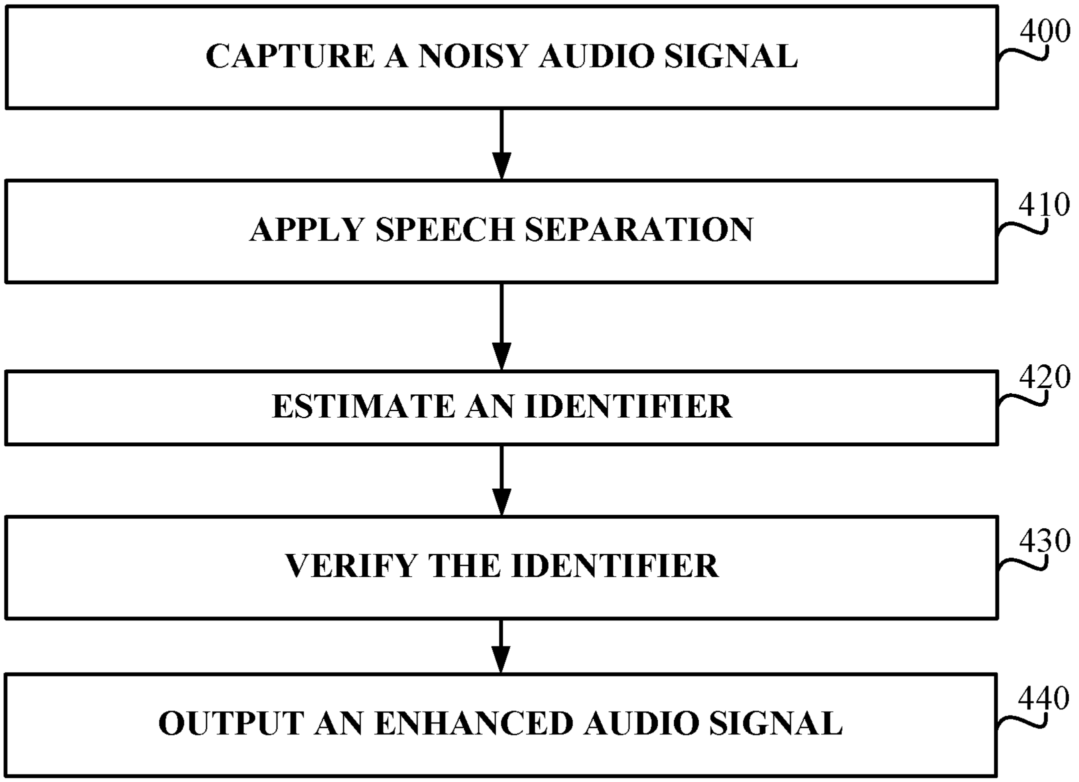
FIG. 4 shows an exemplary flowchart diagram of a method, in accordance with some exemplary embodiments of the disclosed subject matter.

Referring now to FIG. 4 showing an exemplary flowchart diagram of a method, in accordance with some exemplary embodiments of the disclosed subject matter.

On Step 400, a noisy audio signal may be captured from the environment, e.g., similarly to Step 210 of FIG. 2.

On Step 410, speech separation may be applied on the noisy audio signal, e.g., similarly to Step 220 of FIG. 2. For example, the noisy audio signal may be processed at least by applying one or more speech separation models thereon, to obtain at least one separate audio signal that represents a voice of an unidentified entity. In some exemplary embodiments, the unidentified entity may comprise an activated entity that has no determined identifier. In some cases, the unidentified entity may be activated via a map view, by applying acoustic fingerprints that are not stored with an associated identifier, automatically by identifying that an activated entity is speaking with the unidentified entity (e.g., using a semantic analyzer), or the like. In some exemplary embodiments, the speech separation models may utilize acoustic fingerprints of activated entities, other signatures of activated entities, dynamically generated acoustic fingerprints, or the like, in order to isolate the voice of the unidentified entity.

On Step 420, an identifier of the unidentified entity may be estimated, determined, or the like.

In some exemplary embodiments, the estimation may be performed by matching the acoustic fingerprint of the unidentified entity with a profile, or contact information. Based on the matched profile, the identifier of the unidentified entity may be extracted. In some exemplary embodiments, the estimation may be performed based on a calendar event of the user. For example, a scheduled time duration of the calendar event may overlap at least partially to when the noisy audio signal has been captured, and the calendar event may indicate the identifier of the unidentified entity. In some exemplary embodiments, the estimation may be performed based on identities of people in past conversations of the user, contacts of the user that were involved in recent communications with the user, or the like. For example, user's communications may be analyzed to identify conversations performed in a last defined timeframe (e.g., last week, month, or the like), last logged conversations of the user (e.g., lastly spoke with Alice and Bob), or any other past conversations that are prioritized or ranked in any other way. The ranking of the conversations may be used to estimate the identifier of the unidentified entity. For example, contacts that communicated with the user more recently, may have a higher probability to be the unidentified entity.

In some exemplary embodiments, the estimation may be performed based on one or more transcriptions of one or more conversations in the environment. For example, a speech-to-text model may convert a conversation of the user to text, and a semantic analyzer may be deployed to identify within the transcription an indication of identifier of the unidentified entity, e.g., a name pronounced in a certain direction. In some cases, the semantic analyzer may identify a context of the user's conversation, e.g., a professional meeting, a casual meeting, or the like, and estimate the identifier based on the context, based on participants in previous conversations of the user that had a same context, or the like.

In some exemplary embodiments, the estimation of the identifier may be performed based on a combination of one or more calculations. For example, one or more calculations may determine one or more probabilities that candidate identifiers match the unidentified entity, and at least one candidate identifier with a highest matching probability may be selected, utilized as a descriptor of the entity, provided to the user on Step 430, or the like. In some exemplary embodiments, the estimation of the identifier may be performed as part of the offline processing.

On Step 430, the estimated identifier may be verified, e.g., by prompting the user to confirm or decline the estimated identifier. For example, the two highest ranking candidate identifiers may be suggested to the user as corresponding to the unidentified entity, and the user may select one of them. As another example, such as in case the user rejects all suggested identifiers, the user may be prompted to provide an identifier. In some cases, Step 430 may be omitted, and the estimated identifier may be matched automatically to the unidentified entity. In such cases, the user may be enabled to manually modify the identifier, in case the identifier is inaccurate.

On Step 440, an enhanced audio signal may be generated, such as based on the separate audio signals. In some exemplary embodiments, the enhanced audio signal may be generated to comprise at least the separate audio signal that represents the voice of an unidentified entity, e.g., since the unidentified entity may be activated. In some exemplary embodiments, the enhanced audio signal may be provided to the hearables, and outputted to the user via the hearables, e.g., by speakers thereof, similarly to Step 230 of FIG. 2.

Figure 5:
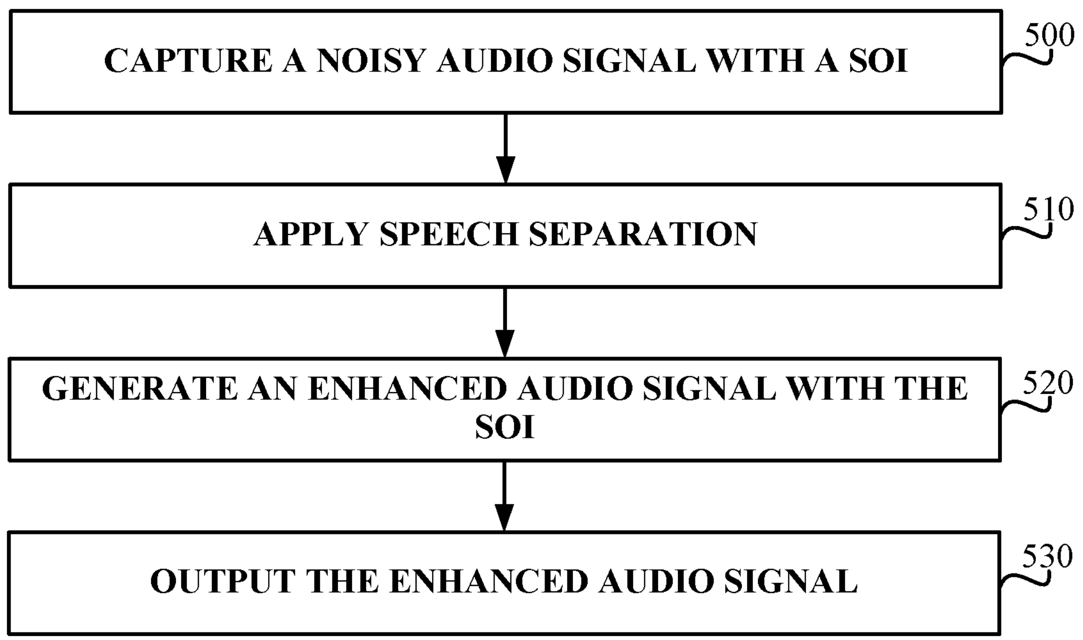
FIG. 5 shows an exemplary flowchart diagram of a method, in accordance with some exemplary embodiments of the disclosed subject matter.

Referring now to FIG. 5 showing an exemplary flowchart diagram of a method, in accordance with some exemplary embodiments of the disclosed subject matter.

On Step 500, a noisy audio signal may be captured from an environment of a user, in which a person may be situated, e.g., similarly to Step 210 of FIG. 2. In some exemplary embodiments, the noisy audio signal may comprise audio emitted by a non-human object such as a phone, a vehicle, an alarm system, an announcement system such as a Public Address (PA) announcement system, or the like. In some cases, in addition to the audio emitted by a non-human object, the noisy audio signal may or may not comprise audio emitted by the person, audio emitted by other people, audio emitted by the user, or the like.

In some exemplary embodiments, the audio emitted by a non-human object may comprise an activated sound-of-interest, e.g., indicating that the user wishes to hear the audio. In some exemplary embodiments, the sound-of-interest may comprise a ringtone, an alert, a car honk, an alarm, a siren, a public announcement, a PA announcement, or the like. In some exemplary embodiments, a list of different types of sounds-of-interests may be obtained from the user, obtained from a server, determined locally at the mobile device, or the like, and the user may be enabled to selectively turn on and off filtrations of the different types of the sounds-of-interests. For example, in case a user does not wish to hear a certain defined sound-of-interest, the sound-of-interest may be muted, deactivated, or the like. In some exemplary embodiments, the user may selectively turn on and off the filtrations via a user interface of a mobile device of the user. In some cases, the user may activate all the sounds-of-interests in a single selection, deactivate all the sounds-of-interests in a single selection, or the like. In some exemplary embodiments, the filtrations may be turned on and off automatically, e.g., based on an automatic computation. For example, the automatic computation may be performed based on a trained model that is trained to identify preferences of the user and configure the filtrations accordingly. As another example, the automatic computation may be performed based on a location of the user. For example, different locations may be associated with different relevant sounds-of-interests. According to this example, a location of the user may be estimated using a location sensor (e.g., of the mobile device), and the location may be automatically associated with relevant sounds-of-interests, which may be activated. For example, the automatic association may be performed based on heuristics, a machine learning classifier, defined rules, or the like.

On Step 510, speech separation may be applied on the noisy audio signal, e.g., similarly to Step 220 of FIG. 2. In some exemplary embodiments, the speech separation may apply one or more speech separation models to extract audio signals therefrom. In some exemplary embodiments, the speech separation may apply speech separation models associated with activated human entities, activated non-human entities, or the like. For example, a speech separation model that is associated with the sound-of-interest, e.g., including the audio emitted by the non-human object, may be applied on the noisy audio signal. In some cases, a speech separation model that is associated with a person may be applied on the noisy audio signal, e.g., to obtain a second separate audio signal that represents the person, in case the person's voice is included in the noisy audio signal.

In some exemplary embodiments, the speech separation model that is associated with the sound-of-interest may be configured to extract the separate audio signal from the noisy audio signal based on an acoustic fingerprint of the non-human object, based on textual descriptions, or the like. For example, a sound retrieval model may be trained to retrieve audio based on textual descriptions of the audio using one or more text-to-speech models, one or more multimodal audio-text representation models, one or more audio classification models, one or more deep learning models, or the like. According to this example, the sound retrieval model may be provided with a textual description of the sound-of-interest, for example "Ambulance", causing the sound retrieval model to retrieve the separate audio signal from the noisy audio signal. In other cases, a machine learning model may be trained to extract audio signals of defined non-human objects in any other way, with or without relying on acoustic fingerprints of the non-human objects. In some cases, in addition to retrieving audio based on textual descriptions, a sound retrieval model may be trained to receive an audio enrollment segment, and extract audio based thereon.

On Step 520, an enhanced audio signal may be generated. In some exemplary embodiments, the enhanced audio signal may be generated based at least on the separate audio signal that represents the sound-of-interest, potentially in combination with the second separate audio signal that represents the person, with other separated audio signals, or the like. In some exemplary embodiments, generating the enhanced audio signal may comprise ensuring that the separate audio signal that represents the sound-of-interest is present in the enhanced audio signal.

In some exemplary embodiments, the enhanced audio signal may be generated to include one or more ratios of each separate audio signal, e.g., using one or more filtration masks. In some exemplary embodiments, a separate audio signal may be multiplied with a respective spectral mask, causing the enhanced audio signal to comprise a corresponding proportion of the separate audio signal. In some cases, a background noise may or may not occupy a certain ratio of the enhanced audio signal, e.g., as set by the user. For example, the enhanced audio signal may comprise 70% separated audio signals and 30% background noise (from which the separated audio signal may or may not be removed). The 70% may comprise 80% of a voice of a person, and 20% of a voice of a sound-of-interest such as a siren. In other cases, any other ratios may be used, selected, or the like.

On Step 530, the enhanced audio signal may be outputted to the user via hearables, e.g., similarly to Step 230 of FIG. 2.

In some exemplary embodiments, the user may be enabled to dynamically activate or deactivate sounds-of-interests. In one scenario, the enhanced audio signal may be outputted during a first duration, timeframe, or the like. For example, the first duration may correspond to one or more iterations of the method of FIG. 5. During the first duration, or subsequently thereto, the user may indicate that the sound-of-interest is no longer of interest to the user. For example, this may be indicated via a user indication, a user interaction with the user interface, or the like. Subsequently to obtaining the user indication, one or more second noisy audio signals may be captured from the environment of the user. When applying voice separation on the second noisy audio signals, a voice separation model that is associated with the sound-of-interest may not be applied to the second noisy audio signals, e.g., since the sound-of-interest was deactivated by the user. A resulting second enhanced audio signal may be outputted to the user via the hearables at a second duration, e.g., later than the first duration, and may not include an audio signal that represents the sound-of-interest. For example, the second duration may correspond to one or more subsequent iterations of the method of FIG. 5. In some cases, the second enhanced audio signal may be generated, or synthesized to comprise an audio signal that represents active entities that have vocal presence in the second noisy audio signal, e.g., the person. In some exemplary embodiments, the user may be provided with the second enhanced audio signal, thereby enabling the user to hear the sound-of-interest in the first duration, and to not hear the sound-of-interest in the second duration.

Referring now to FIG. 6A showing an exemplary environment in which the disclosed subject matter may be utilized, in accordance with some exemplary embodiments of the disclosed subject matter.

In some exemplary embodiments, Environment 600 may comprise one or more Microphones 610. In some cases Microphones 610 may comprise a microphone array that comprises a plurality of microphones, which may be strategically placed to capture sound from different sources or locations. In some cases, Microphones 610 may comprise a multi-port microphone for capturing multiple audio signals. In some cases, Microphones 610 may comprise a single microphone. In some exemplary embodiments, the microphones may comprise one or more microphone types. For example, the microphones may comprise directional microphones that are sensitive to picking up sounds in certain directions, unidirectional microphones that are designed to pick up sound from a single direction or small range of directions, bidirectional microphones that are designed to pick up sound from two directions, cardioid microphones that are sensitive to sounds from the front and sides, omnidirectional microphones that pick up sound with equal gain from all sides or directions, or the like.

In some exemplary embodiments, Environment 600 may comprise a Mobile Device 620. In some exemplary embodiments, Mobile Device 620 may comprise a mobile device of the user such as a smartphone, a Personal Computer (PC), a tablet, an end device, or the like.

In some exemplary embodiments, Environment 600 may comprise a Server 630, which may communicate with Mobile Device 620 via one or more communication mediums, such as Medium 605.

For example, Medium 605 may comprise a wireless and/or wired network such as, for example, a telephone network, an extranet, an intranet, the Internet, satellite communications, off-line communications, wireless communications, transponder communications, a local area network (LAN), a wide area network (WAN), a virtual private network (VPN), or the like. In some exemplary embodiments, Medium 605 may utilize any known wireless standard (e.g., Wi-Fi, Bluetooth™, LE-Audio, or the like), near-field capacitive coupling, short range wireless techniques, physical connection protocols such as Lightning™, or the like. In some exemplary embodiments, Medium 605 may comprise a shared, public, or private network, a wide area network or local area network, and may be implemented through any suitable combination of wired and/or wireless communication networks. In some exemplary embodiments, Medium 605 may comprise a short range or near-field wireless communication systems for enabling communication Mobile Device 620 and Microphones 610. In some exemplary embodiments, Medium 605 may enable communications between Microphones 610, Mobile Device 620, Server 630, Hearables 640, or the like.

In some exemplary embodiments, Environment 600 may comprise Hearables 640, which may comprise headphones, wired earplugs, wireless earplugs, a Bluetooth™ headset, a bone conduction headphone, electronic in-ear devices, in-ear buds, or the like.

In some cases, a processing unit may comprise one or more integrated circuits, microchips, microcontrollers, microprocessors, one or more portions of a Central Processing Unit (CPU), Graphics Processing Unit (GPU), Digital Signal Processing (DSP), Field-Programmable Gate Array (FPGA), Inertial Measurement Unit (IMU), or other circuits suitable for executing instructions or performing logic operations. The instructions executed by the processing unit may, for example, be pre-loaded into a memory that is integrated with the processing unit, pre-loaded into a memory that is embedded into the processing unit, may be stored in a separate memory, or the like. In some exemplary embodiments, the processing unit may be integrated with Microphones 610, Mobile Device 620, Server 630, Hearables 640, a combination thereof, or the like. In some exemplary embodiments, the functionality of the processing unit may be distributed between two or more of Microphones 610, Mobile Device 620, Server 630, and Hearables 640. For example, the processing unit may be integrated in two or more devices, causing some processing of the processing unit to be performed at one device (e.g., Mobile Device 620), and other processing of the processing unit to be performed at a different device (e.g., Server 630). As another example, the processing unit may be integrated into a single device, e.g., Mobile Device 620. In some exemplary embodiments, the processing unit may be configured to obtain captured audio signals from Microphones 610, or from any other source such as from a different microphone array, from Server 630, or the like.

Figure 6B:
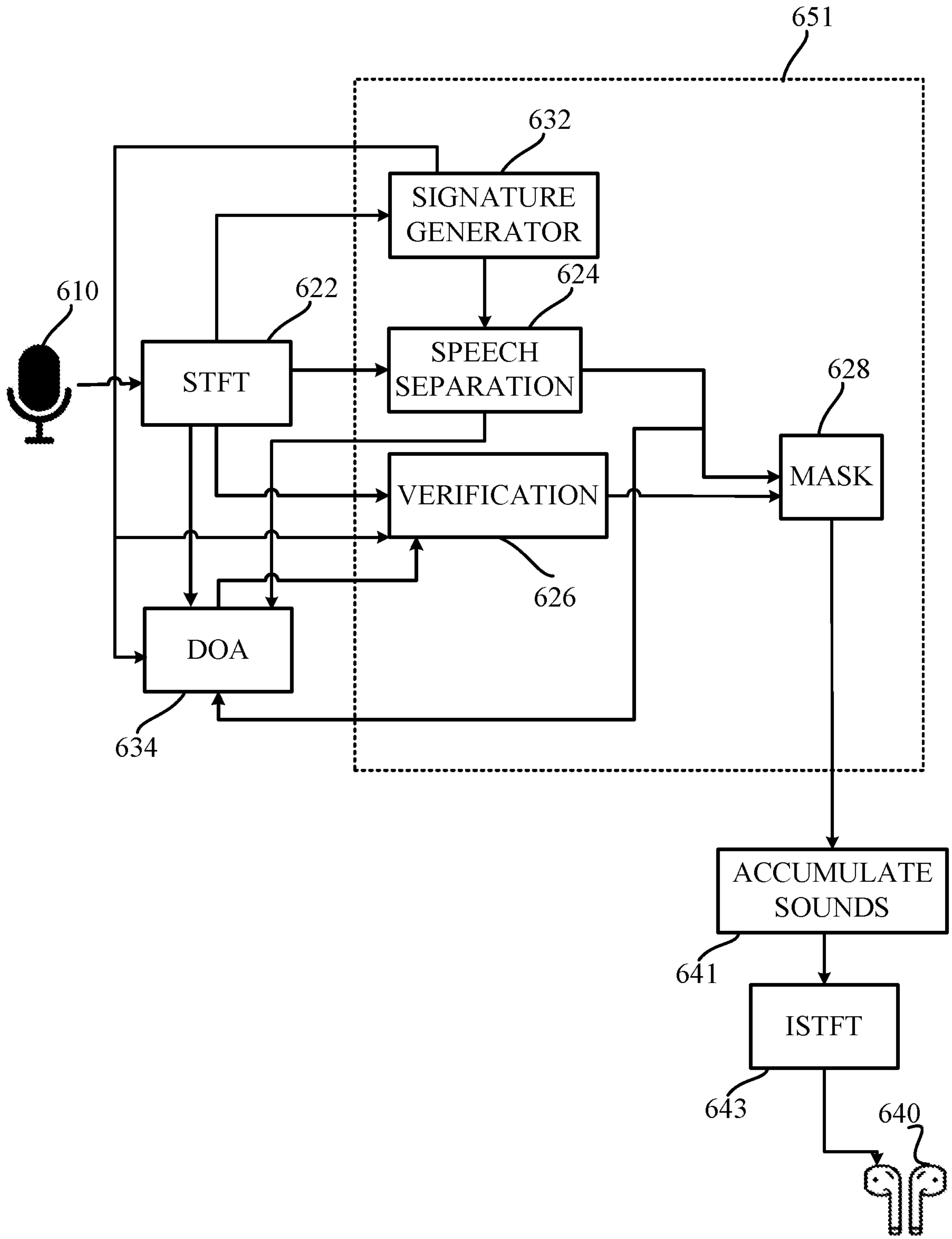
FIG. 6B shows an exemplary scenario of utilizing the disclosed subject matter, in accordance with some exemplary embodiments of the disclosed subject matter.

Referring now to FIG. 6B showing an exemplary scenario of utilizing the disclosed subject matter, in accordance with some exemplary embodiments of the disclosed subject matter.

In some exemplary embodiments, FIG. 6B depicts a non-limiting scenario of implementing the disclosed subject matter, that may be performed in the environment of FIG. 6A. In some exemplary embodiments, the non-limiting scenario of FIG. 6B may be performed in case a user of Mobile Device 620 activates a program associated with the disclosed subject matter, in case a user of Hearables 640 activates the program, in case the program is activated automatically, e.g., when the user is estimated to be in a noisy situation, or the like.

In some exemplary embodiments, one or more entities may be activated. For example, the entities may be activated in response to obtaining activation indications from the user via Mobile Device 620 or Hearables 640, from Server 630, or the like. As another example, all entities may be activated before a user activation indication is obtained, and in response to obtaining the activation indication, the remaining entities may be deactivated. For example, activating all entities may comprise activating all profiles of entities that are stored for the user, configuring the processing unit to separate all voices in the noisy audio signal and apply available signatures thereto, or the like. As another example, a defined set of entities may be activated as a default setting, and the user may adjust the set of entities that are activated, e.g., via Mobile Device 620.

In some exemplary embodiments, Microphones 610 may be configured to capture one or more audio channels in a noisy environment of the user, thereby obtaining a noisy audio signal with a set duration. For example, Microphones 610 may iteratively capture audio signals with a duration of 5 milliseconds (ms), 10 ms, 20 ms, 30 ms, or the like. In some exemplary embodiments, the number of channels captured by Microphones 610 may correspond to a number of microphones in the microphone array of Microphones 610. For example, in case Microphones 610 comprises an array of three microphones, three respective audio channels may be captured by Microphones 610. The audio channels may be captured simultaneously, in at least partially overlapping time periods, with one or more delays between channels that are lesser than a specified delay threshold, or the like. In some exemplary embodiments, at least some of the audio channels captured by Microphones 610 may be provided to the processing unit, e.g., via Medium 605, via a Lightning connector, a USB-C connector, an MFI connector, or the like.

In some exemplary embodiments, the processing unit may convert the noisy audio signal from the time domain to the frequency domain, such as by applying STFT 622, or any other transformation, on the noisy audio signal. For example, the noisy audio signal may be transformed using learnable time-frequency features, using a trained CNN model, or the like. In other cases, the noisy audio signal may be utilized without being transformed to the frequency domain, at least a portion of the noisy audio signal may be utilized without being transformed to the frequency domain, or the like. In some exemplary embodiments, audio channels captured by different microphones, may or may not be processed separately by STFT 622. For example, in case Microphones 610 captured three audio channels, STFT 622 may be applied to each channel separately, resulting with at least one converted audio channel. In some cases, STFT 622 may be applied on two or more channels simultaneously.

In some exemplary embodiments, at least a portion the converted noisy audio signal may be provided for processing to Speech Separation 624, Verification 626, Signature Generator 632, DOA 634, or the like. In some exemplary embodiments, some processing models may be entity-specific, and may be utilized for each activated entity. For example, models within Processing Operations 651 may be performed separately for each activated entity. In such cases, models within Processing Operations 651 may be applied on the converted noisy audio signal for each activated entity, separately. In other cases, also STFT 622 and DOA 634 may be entity-specific, e.g., applied separately on the converted noisy audio signal for each activated entity. In other cases, some models within Processing Operations 651 may not be entity-specific, and may be processed for multiple entities. The models may or may not be personalized using audio fingerprints, may or may not be directional (using a DoA), may or may not be fed by multiple microphones, and may or may not be applied on multiple entities simultaneously. In some exemplary embodiments, some models may be executed over a different number of channels for different activated entities. For example, Verification 626 may be executed on a single channel (e.g., of a selected microphone) for a first activated entity, and on a plurality of channels for a second activated entity (e.g., upon obtaining a DoA for the second activated entity).

In some exemplary embodiments, one or more channels of the converted noisy audio signal may be provided to Speech Separation 624, which may comprise an entity-specific model such as a machine learning model, a DSP-based model, a sound retrieval model that is trained to retrieve sounds according to textual descriptions, a deep learning classifier, a supervised or unsupervised neural network, a combination thereof, or the like. For example, at least one channel of the converted noisy audio signal may be provided to Speech Separation 624. In some exemplary embodiments, Speech Separation 624 may obtain an acoustic signature of an activated entity, and extract from the converted noisy audio signal, a separated voice of the entity, e.g., as an audio signal, a stereo audio, a mono channel, or the like. In other cases, Speech Separation 624 may not be perform on a single entity, and may be trained to extract multiple voices associated with multiple input acoustic signatures.

In some exemplary embodiments, a verification module such as Verification 626 may verify that the activated entity, for which the separated voice is extracted by Speech Separation 624, has a vocal presence in the converted noisy audio signal from STFT 622. For example, this may indicate whether Speech Separation 624 functioned correctly. In some exemplary embodiments, Verification 626 may obtain one or more channels of the converted noisy audio signal (e.g., three channels thereof), obtain the acoustic signature of the activated entity, and determine whether or not the converted noisy audio signal comprises sound that matches received acoustic signature. In some exemplary embodiments, Verification 626 may operate without an acoustic signature, such as by obtaining one or more channels of the converted noisy audio signal (e.g., three channels thereof), a direction of interest associated with the entity, or the like, and determine whether or not the converted noisy audio signal matches the direction of interest. For example, in case a beam associated with the DoI angle is sufficiently narrow (complies with a threshold), Verification 626 may operate without utilizing the acoustic signature.

In some exemplary embodiments, Verification 626 may process all the channels of the converted noisy audio signal (multi-channel), or process a portion thereof. For example, in case Verification 626 obtains a Direction of Interest (DoI) from DOA 634, Verification 626 may process three channels of the converted noisy audio signal, and in case Verification 626 does not obtain a DoI indication from DOA 634 (e.g., at a beginning of the session), Verification 626 may process a single channel (mono-channel) of the converted noisy audio signal. In some exemplary embodiments, Verification 626 may utilize the DoI angle to further verify the presence of the respective entity, to identify an incorrect matching of a signature to an audio signal (e.g., in case of similar voices in the environment), or the like. In some cases, the DoI angle may be utilized to verify separated voice in addition to the using the signature, or instead of using the signature. In some exemplary embodiments, Verification 626 may comprise a Voice Activity Detection (VAD) model, a data-driven model, or any other model.

In some exemplary embodiments, Verification 626 may generate a value for Filtration Mask 628, such as a value of zero for a failure of matching the acoustic signature with the noisy audio signal, and a value of one for successfully matching the acoustic signature with the noisy audio signal. In other cases, Verification 626 may generate a continuous variable for Filtration Mask 628, such as a value between zero and one. For example, such values may be clustered to zero or one, and outputted as Filtration Mask 628. In some exemplary embodiments, Filtration Mask 628 may be multiplied with the separated voice of the target entity that is extracted by Speech Separation 624, thus nullifying or eliminating the separated voice in case Filtration Mask 628 has a value of zero, and retaining the separated voice in case Filtration Mask 628 has a value of one.

In some embodiments, the signature generated by Signature Generator 632, and/or the output of Speech Separation 624 may be provided to DoA 634, in order to verify that the detected angle of arrival is associated with the correct entity, as detailed below.

In some exemplary embodiments, after all activated entities are processed in this way, the separated voices of the entities may be combined, accumulated, or the like, and provided to Hearables 640. For example, the separated voices may be provided to Accumulate Sounds 641, which may accumulate the sounds. Sounds that were nullified by Filtration Mask 628 may not have a vocal presence in the accumulate audio signal that is outputted from Accumulate Sounds 641. In some exemplary embodiments, in case the noisy audio signal was converted to the frequency domain, Inverse STFT (ISTFT) 643 may be applied to the accumulate audio signal from Accumulate Sounds 641, such as in order to convert the signal back from the frequency domain to the time domain, before providing the resulting audio signal to Hearables 640. In some exemplary embodiments, the separated voices of the entities may be combined at the processing unit, at Hearables 640, at Mobile Device 620, or the like. In some cases, ISTFT 643 may not be applied to a model that was not transformed to the frequency domain. For example, Processing Operations 651 may comprise a combination of models, including some generative models, some discriminative models, or the like, some of which may operate on one or more channels in the time domain, while others may operate on one or more channels in the frequency domain. According to this example, for models operating in the time domain, neither STFT 622 nor ISTFT 643 may be applied.

In some exemplary embodiments, an online workflow may refer to all operations that are necessarily performed for each noisy signal captured by Microphones 610. In some exemplary embodiments, the online workflow may comprise STFT 622, Speech Separation 624, Verification 626, Filtration Mask 628, Accumulate Sounds 641, and ISTFT 643. In some exemplary embodiments, the operations of the online workflow may be required to have, together, a limited latency threshold such that the user may be enabled to participate in a conversation using the processed outputs from the online workflow. For example, an overall delay that is greater than two seconds may not enable the user to participant in a conversation comfortably.

In some exemplary embodiments, some operations may be performed as part of an offline workflow, which may not necessarily be fully performed and computed for each noisy signal that is captured by Microphones 610, which may not necessarily provide an immediate output for each noisy signal, or the like. For example, Signature Generator 632 and DOA 634 may be part of the offline workflow, and may not provide an output for each noisy signal. In some cases, a model may require calculations that take more time than the latency threshold of the online workflow, e.g., a minute, and thus may not be executed as part of the online workflow. In some cases, DOA 634 may perform complex computations that may not necessarily comply with the latency threshold of the online workflow, may require a longer lookahead than models that participate in the online workflow, or the like. For example, DOA 634 may not be able to compute a DoA of an activated entity during an initial time duration from the activation of DOA 634, causing Verification 626 to be activated without having an estimated DoI of a respective entity. In some cases, after the initial time duration, an initial DoA of the respective entity may be computed, and provided to Verification 626 as a DoI.

In some exemplary embodiments, DOA 634 may be configured to obtain one or more channels of the noisy audio signal (e.g., three channels), obtain a separated voice from Speech Separation 624, the acoustic signature of the respective entity, or the like, and output a scalar, such as a value between the range of [−180, +180] degrees, that indicates the DoA of the SoI, a range thereof, or the like. In some exemplary embodiments, the DoA may be defined in relation to a predefined anchor, location point, or the like, such as with respect to a location of Microphones 610, a location of Mobile Device 620, a location of Hearables 640, a line parallel to the processing unit, or the like. In some cases, DOA 634 may comprise a beamforming receiver array, a learnable probabilistic model, a Time Difference of Arrival (TDoA) model, a data-driven model such as a CNN, a RNN, a Residual Neural Network (ResNet), a Transformer, a Conformer, or the like. In other cases, instead of measuring the DoA of the SoI, DOA 634 may obtain an indication of the DoA from the user, from Server 630, or the like.

In some exemplary embodiments, DOA 634 may search for a dominant direction in the noisy audio signal, such as by applying beamforming processing on each angle, one or more bins of angles or the like. In some exemplary embodiments, for each measured angle, a score may be calculated. For example, in case beamforming processing is applied on all angles, 360 scores may be obtained (one score for each angle). As another example, in case beamforming processing is applied on bins of two or more angles, e.g., 36 angles, scores may be obtained (one for each 36 angles). In some exemplary embodiments, in case that one direction is dominant, one or more respective angles may have higher scores than the remaining angles, and the respective angles may be selected and provided to the verification within DOA 634 as a constraint, e.g., a DoI constraint. In some exemplary embodiments, in case no direction is estimated to be significantly dominant (having a difference in score that is greater than a threshold compared to scores of neighboring angles), such as during a quiet moment of a conversation, DOA 634 may provide no value, a Null value, return 'False', may terminate, or the like.

In some exemplary embodiments, in case a dominant direction is determined, DOA 634 may perform a verification step prior to providing the DoI to Verification 626, e.g., within DOA 634. For example, DOA 634 may obtain the acoustic signature of the respective entity, and determine whether the separated voice from Speech Separation 624 matches the acoustic signature. In some exemplary embodiments, in case the verification is successful, the dominant angle may be estimated to be associated with the respective entity, e.g., since the entity speaks in the respective time duration. In some exemplary embodiments, in case the verification fails, the dominant direction may be disregarded, and may not be provided to Verification 626. In other cases, the verification step may be performed prior to estimating a dominant direction. In some cases, in case a dominant direction is determined, a configuration of Speech Separation 624 may be adjusted to process a plurality of audio channels, together with a DoI from DOA 634 that corresponds to the dominant direction, the acoustic signature, or the like. For example, before obtaining the DoI, Speech Separation 624 may be configured to process a single audio channel.

In some exemplary embodiments, after DOA 634 is activated, it may or may not be operated continuously, periodically, or the like. For example, DOA 634 may be applied every determined time period for activated entities, e.g., to save computational power. In some cases, DOA 634 may determine angles for non-activated entities in the environment, e.g., every longer time period. For example, DoAs of activated entities may be calculated more frequently than DoAs of non-activated entities. In some cases, DOA 634 may determine angles for non-activated entities, e.g., in case they are identified in the environment, so that in case the non-activated entities are activated by the user, Verification 626 may obtain a DoI immediately, without waiting for a new calculation of DOA 634. For example, the DoI may comprise the most recent DoI that was computed for the entity.

In some exemplary embodiments, Signature Generator 632 may be configured to obtain one or more channels of the noisy audio signal (e.g., three channels), obtain the acoustic signature of the respective entity, or the like. In some exemplary embodiments, Signature Generator 632 may be configured to adjust or modify the acoustic signature according to the noisy audio signal, e.g., to be more accurate. For example, the acoustic signature of an entity that was generated based on one or more audio records of the entity, may be adjusted to be generated based on a portion of the noisy signal that is spoken by the entity, alone or in combination with the previous audio records of the entity. In some cases, Signature Generator 632 may generate one or more acoustic signatures on-the-fly, such as based on vocal records. In some exemplary embodiments, Signature Generator 632 may be configured to obtain one or more acoustic signatures from Mobile Device 620, Server 630, or the like, and provide acoustic signatures to any model that requests an acoustic signature. In some cases, Signature Generator 632 may obtain one or more DoAs from DOA 634, such as in order to verify that the noisy signal is associated with the correct entity, before adjusting an acoustic signature of the entity.

In some exemplary embodiments, as part of the online workflow, the separated audio signals, as outputted from Filtration Mask 628, may be processed. For example, the separated audio signals may be accumulated, e.g., as part of Accumulate Sounds 641. Accumulate Sounds 641 may be configured to ensure that the accumulated sounds are not greater than a threshold (e.g., a Maximal Possible Output (MPO)), so that the output signal is not louder than desired. For example, due to the independency of the separated audio signals, the sum of the accumulated sounds may be greater than the captured noisy signal. Accumulate Sounds 641 may bound the volume of the output signal to comprise a certain proportion of the volume of the noisy audio signal, e.g., 100%, 110%, or the like.

In some exemplary embodiments, the accumulated separated audio signals may be processed to mix therein a proportion of background noise, e.g., as defined by the user, by a default setting, or the like. For example, a user may indicate via a user interface that she wishes to preserve 30% of the environment background noise, causing the accumulated separated audio signals to constitute the remaining 70%. In some cases, the environment background noise may be augmented with one or more additional sounds, such as notifications or alerts of Mobile Device 620, which may not be part of the user's environment and may be provided directly to the processing unit. In some cases, the background noise may be defined to include only sounds from Mobile Device 620, and no environment noise.

In some exemplary embodiments, the mixed audio signal may be converted with ISTFT 643, and processed in any other way, such as by wrapping the signal, compressing the signal, or the like, thereby obtaining an output audio signal that can be transmitted to Hearables 640. For example, further processing may comprise applying a Multi Band (MB) compressor, applying a Low Complexity Communication Codec (LC3) compressor, applying any other audio compression, applying one or more expansion units, DSPs, Pulse-Code Modulations (PCMs), equalizers, limiters, signal smoothers, performing one or more adjustment to an audiogram of the user, or the like.

In some exemplary embodiments, the output audio signal may be transmitted to Hearables 640, e.g., via Medium 605. In some exemplary embodiments, Hearables 640 may process the output audio signal and synthesize the output audio signal using one or more speakers, so that the user will be enabled to hear desired sounds. In case the user is not satisfied with one or more sounds, the user may activate or deactivate one or more entities, modify a volume of each activated entity, or the like.

In some exemplary embodiments, any of the communications described in this scenario may be implemented via Medium 605. In some cases, Server 630 may be omitted from the scenario, may be used to provide acoustic fingerprints, may be utilized for offline computations, or the like.

Figure 7:
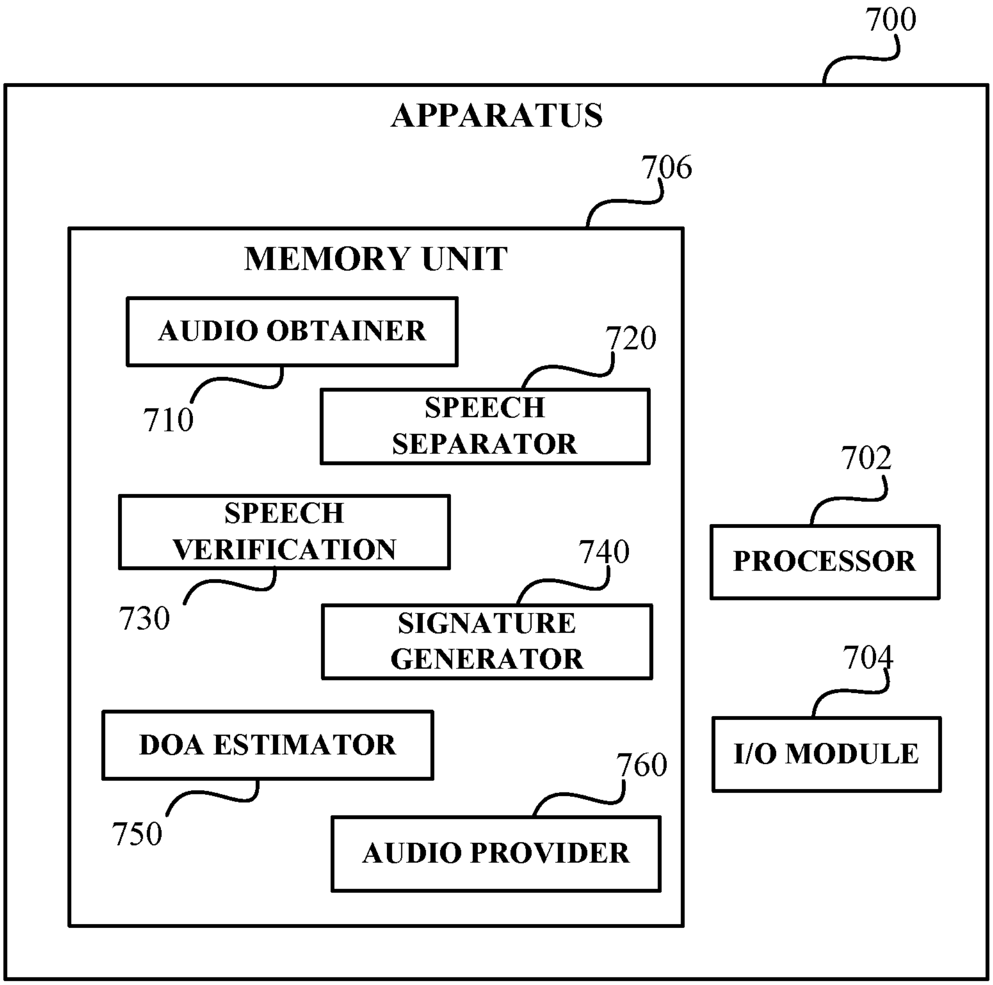
FIG. 7 shows an exemplary block diagram of an apparatus, in accordance with some exemplary embodiments of the disclosed subject matter.

Referring now to FIG. 7 showing a block diagram of an apparatus, in accordance with some exemplary embodiments of the disclosed subject matter.

In some exemplary embodiments, an Apparatus 700 may comprise a Processor 702. Processor 702 may be a Central Processing Unit (CPU), a microprocessor, an electronic circuit, an Integrated Circuit (IC) or the like. Processor 702 may be utilized to perform computations required by Apparatus 700 or any of its subcomponents. Processor 702 may be configured to execute computer-programs useful in performing the methods of FIGS. 1-5, 6B, or the like.

In some exemplary embodiments of the disclosed subject matter, an Input/Output (I/O) Module 704 may be utilized to provide an output to and receive input from a user. I/O Module 704 may be used to transmit and receive information to and from the user or any other apparatus, e.g., a plurality of user devices, entities depicted in FIG. 6A, modules depicted in FIG. 6B, or the like, that are in communication therewith.

In some exemplary embodiments, Apparatus 700 may comprise a Memory Unit 706. Memory Unit 706 may be a short-term storage device or long-term storage device. Memory Unit 706 may be a persistent storage or volatile storage. Memory Unit 706 may be a disk drive, a Flash disk, a Random Access Memory (RAM), a memory chip, or the like. In some exemplary embodiments, Memory Unit 706 may retain program code operative to cause Processor 702 to perform acts associated with any of the subcomponents of Apparatus 700. In some exemplary embodiments, Memory Unit 706 may retain program code operative to cause Processor 702 to perform acts associated with any of the steps in FIGS. 1-5, 6B, or the like.

The components detailed below may be implemented as one or more sets of interrelated computer instructions, executed for example by Processor 702 or by another processor. The components may be arranged as one or more executable files, dynamic libraries, static libraries, methods, functions, services, or the like, programmed in any programming language and under any computing environment.

In some exemplary embodiments, Audio Obtainer 710 may be configured to obtain audio signals from one or more microphones, e.g., via I/O Module 704 or via any other component or device.

In some exemplary embodiments, Speech Separator 720 may correspond to Speech Separation 624 of FIG. 6B, and may be configured to obtain the audio signals from Audio Obtainer 710, to obtain an acoustic signature from Signature Generator 740, and separate therefrom speech.

In some exemplary embodiments, Speech Verification 730 may correspond to Verification 626 of FIG. 6B, and may be configured to verify that the separated audio from Speech Separator 720 is correct, e.g., that the respective entity is vocally present in the noisy audio signal. In some exemplary embodiments, Speech Verification 730 may provide a mask for nullifying or reducing a volume of non-compliant audio signals.

In some exemplary embodiments, Signature Generator 740 may correspond to Signature Generator 632 of FIG. 6B, and may be configured to obtain acoustic signatures, e.g., from a server, a local storage, or the like, to provide acoustic signatures to components of Memory Unit 706, to generate new acoustic signatures based on audio signals from Audio Obtainer 710, to adjust existing acoustic signatures based on audio signals from Audio Obtainer 710, or the like.

In some exemplary embodiments, DoA Estimator 750 may correspond to DOA 634 of FIG. 6B, and may be configured to estimate DoAs of separated voices from Speech Separator 720, and provide them to Speech Verification 730 for verification.

In some exemplary embodiments, Audio Provider 760 may correspond to Accumulate Sounds 641 and ISTFT 643 of FIG. 6B, and may be configured to process verified audio from Speech Verification 730 of each entity, and provide an output signal to one or more hearable devices, such as hearables of a user. In some cases, Audio Provider 760 may present estimated locations of entities in a map view, such as the map view of FIG. 3B.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

capturing a noisy audio signal from an environment of a user, the environment comprising a plurality of people participating in at least one conversation, the plurality of people comprising a person, the noisy audio signal includes audio emitted by a non-human object and audio emitted by the person, wherein the audio emitted by the non-human object comprises a sound-of-interest;

extracting, by a first machine learning model, from the noisy audio signal, based on an acoustic fingerprint of the non-human object, a first separate audio signal that represents the sound-of-interest, the first separate audio signal is isolated from other audio in the noisy audio signal, the first separate audio signal excluding the audio emitted by the person;

extracting, by a second machine learning model, from the noisy audio signal, based on an acoustic fingerprint of the person, a second separate audio signal that represents the person, the second separate audio signal excluding the sound-of-interest;

generating an enhanced audio signal, the enhanced audio signal is based at least on the first separate audio signal and the second separate audio signal, wherein said generating comprises ensuring that the first separate audio signal and the second separate audio signal are present in the enhanced audio signal; and outputting the enhanced audio signal to the user via at least one hearable device.

2. The method of claim 1, wherein the first machine learning model and the second machine learning model are a same machine learning model, the same machine learning model is trained to extract audio signals of humans and defined non-human objects.

3. The method of claim 1, wherein said capturing is performed by a single microphone or by multiple microphones.

4. The method of claim 1, wherein the sound-of-interest is at least one of: a ringtone, an alert, a car honk, an alarm, a public announcement, and a siren.

5. The method of claim 1, wherein the non-human object comprises at least one of:

a phone;

a public announcement system;

a vehicle; and an alarm system.

6. The method of claim 1, further comprising obtaining from the user a list of different types of sounds-of-interests, wherein the user is enabled to selectively turn on and off filtrations of the different types of the sounds-of-interests.

7. The method of claim 6, wherein said selectively turning on and off the filtrations is performed via a user interface of a mobile device of the user, or based on an automatic computation.

8. The method of claim 1, wherein said outputting is performed during a first duration of the at least one conversation, the method further comprising:

during the first duration, obtaining a user indication indicating that the sound-of-interest is no longer of interest to the user;

subsequently to said obtaining the user indication, capturing a second noisy audio signal from the environment of the user during a second duration of the at least one conversation; and outputting a second enhanced audio signal to the user via the at least one hearable device during the second duration, the second duration is after the first duration, the second enhanced audio signal is generated to comprise an audio signal that represents the person, the second enhanced audio signal excludes an audio signal that represents the sound-of-interest, whereby the user is enabled to hear the sound-of-interest during the first duration and not hear the sound-of-interest during the second duration.

9. The method of claim 1, wherein the noisy audio signal comprises a background sound, wherein the enhanced audio signal excludes the background sound or includes a reduced version of the background sound.

10. The method of claim 9, wherein the background sound is at least one of: a voice of a second person that is different from the person, and a sound emitted by a non-human object other than said non-human object that emits the sound-of-interest.

11. The method of claim 1, wherein said generating the enhanced audio signal further comprises:

accumulating at least the first separate audio signal and the second separate audio signal; and bounding a volume of the enhanced audio signal so as not to exceed a predetermined proportion of a volume of the noisy audio signal.

12. The method of claim 1, wherein the first machine learning model and the second machine learning model are different machine learning models, the first machine learning model being trained to extract audio signals associated with non-human objects, and the second machine learning model being trained to extract audio signals associated with humans.

13. An apparatus comprising a processor and coupled memory, the processor being adapted to:

capture a noisy audio signal from an environment of a user, the environment comprising a plurality of people participating in at least one conversation, the plurality of people comprising a person, the noisy audio signal includes audio emitted by a non-human object and audio emitted by the person, wherein the audio emitted by the non-human object comprises a sound-of-interest;

extract, by a first machine learning model, from the noisy audio signal, based on an acoustic fingerprint of the non-human object, a first separate audio signal that represents the sound-of-interest, the first separate audio signal is isolated from other audio in the noisy audio signal, the first separate audio signal excluding the audio emitted by the person;

extract, by a second machine learning model, from the noisy audio signal, based on an acoustic fingerprint of the person, a second separate audio signal that represents the person, the second separate audio signal excluding the sound-of-interest;

generate an enhanced audio signal, the enhanced audio signal is based at least on the first separate audio signal and the second separate audio signal, wherein said generating comprises ensuring that the first separate audio signal and the second separate audio signal are present in the enhanced audio signal; and output the enhanced audio signal to the user via at least one hearable device.

14. The apparatus of claim 13, wherein the sound-of-interest is at least one of: a ringtone, an alert, a car honk, an alarm, a public announcement, and a siren.

15. The apparatus of claim 13, wherein the non-human object comprises at least one of: a phone; a public announcement system; a vehicle; and an alarm system.

16. The apparatus of claim 13, wherein the processor is further adapted to obtain from the user a list of different types of sounds-of-interests, wherein the user is enabled to selectively turn on and off filtrations of the different types of the sounds-of-interests.

17. A method comprising:

capturing a noisy audio signal from an environment of a user, the environment comprising a plurality of people participating in at least one conversation, the plurality of people comprising a person, the noisy audio signal includes audio emitted by a non-human object and audio emitted by the person, wherein the audio emitted by the non-human object comprises a sound-of-interest;

providing a sound retrieval model with the noisy audio signal and with a textual description of the audio emitted by the non-human object, the sound retrieval model being trained to retrieve audio from noisy audio signals based on textual descriptions, wherein the sound retrieval model retrieves from the noisy audio signal a first separate audio signal that represents the sound-of-interest without relying on acoustic fingerprints of the non-human object, the first separate audio signal is isolated from other audio in the noisy audio signal, the first separate audio signal excluding the audio emitted by the person;

extracting, by a machine learning model, from the noisy audio signal, based on an acoustic fingerprint of the person, a second separate audio signal that represents the person, the second separate audio signal excluding the sound-of-interest;

generating an enhanced audio signal, the enhanced audio signal is based at least on the first separate audio signal and the second separate audio signal, wherein said generating comprises ensuring that the first separate audio signal and the second separate audio signal are present in the enhanced audio signal; and outputting the enhanced audio signal to the user via at least one hearable device.

18. The method of claim 17, further comprising obtaining from the user a list of different types of sounds-of-interests, wherein the textual description provided to the sound retrieval model is a textual description of the sound-of-interest, wherein a type of the sound-of-interest is selected from the list.

19. The method of claim 17, wherein the sound retrieval model comprises at least one of: a multimodal audio-text representation model, an audio classification model, and a deep learning model.

20. The method of claim 17, further comprising:

obtaining, by a verification module, the noisy audio signal and a direction of interest associated with the non-human object;

determining, by the verification module, whether the non-human object is acoustically present in the noisy audio signal;

applying to the first separate audio signal a filtrating mask having a value based on the determining; and nullifying the first separate audio signal when the non-human object is determined not to be acoustically present.

* * * * *